(12) United States Patent
Tojima et al.

(10) Patent No.: US 12,710,757 B2
(45) Date of Patent: Aug. 18, 2026

(54) INFORMATION OUTPUT METHOD AND INFORMATION OUTPUT DEVICE

(71) Applicant: Panasonic Intellectual Property Management Co., Ltd., Osaka (JP)

(72) Inventors: Masayoshi Tojima, Osaka (JP); Shunsuke Kuhara, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 359 days.

(21) Appl. No.: 18/376,083

(22) Filed: Oct. 3, 2023

(65) Prior Publication Data

US 2024/0028049 A1 Jan. 25, 2024

Related U.S. Application Data

(63) Continuation of application No. PCT/JP2022/013188, filed on Mar. 22, 2022.

(Continued)

(51) Int. Cl.

*G05D 1/02* (2020.01)
*G05B 19/4155* (2006.01)
*G05D 1/00* (2006.01)

(52) U.S. Cl.

CPC ....... *G05D 1/0297* (2013.01); *G05B 19/4155* (2013.01); *G05B 2219/50391* (2013.01)

(58) Field of Classification Search

CPC .............. G05D 1/0297; G05B 19/4155; G05B 2219/50391

(Continued)

(56) References Cited

U.S. PATENT DOCUMENTS

2016/0046025 A1* 2/2016 Miyashita .............. G06Q 30/06 700/264
2018/0130160 A1* 5/2018 Alexander ............. G06Q 50/40

(Continued)

FOREIGN PATENT DOCUMENTS

JP 2005-186220 7/2005
JP 2014-188597 10/2014

(Continued)

OTHER PUBLICATIONS

English Translation for JP2021060822A (Year: 2025).*

(Continued)

*Primary Examiner* — Mahmoud S Ismail
(74) *Attorney, Agent, or Firm* — Wenderoth, Lind & Ponack, L.L.P.

(57) ABSTRACT

An information output method of an information output device includes: obtaining, from each of at least two autonomous mobile robots each providing at least one service, first information including information about a location of the robot and information about a service provided by the robot; presenting, based on the first information, information about at least two services provided by the at least two robots to a terminal device used by a user receiving the service; obtaining, from the terminal device, second information including: a service providing location designated by the user; and information about the service selected by the user; determining, based on the second information, one robot providing the service selected by the user among the at least two robots; and outputting, to the one robot determined, first control information used for moving the one robot to the providing location.

14 Claims, 14 Drawing Sheets

Related U.S. Application Data

(60) Provisional application No. 63/176,544, filed on Apr. 19, 2021.

(58) Field of Classification Search
USPC .......................................................... 701/241
See application file for complete search history.

(56) References Cited

U.S. PATENT DOCUMENTS

| | | | |
|---|---|---|---|
| 2019/0049988 | A1 | 2/2019 | Meij |
| 2019/0205827 | A1 | 7/2019 | Yamaguchi et al. |
| 2019/0236520 | A1 | 8/2019 | Kaneko et al. |
| 2020/0050198 | A1* | 2/2020 | Donnelly ............... G06Q 50/40 |
| 2021/0373576 | A1* | 12/2021 | Sohn ...................... B25J 11/008 |
| 2022/0114645 | A1* | 4/2022 | Ferguson ................. G08G 1/04 |

FOREIGN PATENT DOCUMENTS

| | | | |
|---|---|---|---|
| JP | 2019-61325 | | 4/2019 |
| JP | 2019-516201 | | 6/2019 |
| JP | 2019-131360 | | 8/2019 |
| JP | 2021-60822 | | 4/2021 |
| JP | 2021060822 | A * | 4/2021 |
| KR | 10-2018-0037855 | | 4/2018 |
| WO | 2017/156586 | | 9/2017 |
| WO | 2018/038080 | | 3/2018 |
| WO | 2020/141637 | | 7/2020 |

OTHER PUBLICATIONS

Extended European Search Report issued Sep. 2, 2024 in European Patent Application No. 22791448.8.

International Search Report issued Jun. 21, 2022 in International (PCT) Application No. PCT/JP2022/013188.

* cited by examiner 1
100
Remote operating system
400
Example of service providing area: residential area
Soft-serve ice cream
200
Beer
Ice-cream sales robot
Draft-beer sales robot
Entertainment play robot
Sports broadcast robot
Trash can
Cleaning robot
300
500

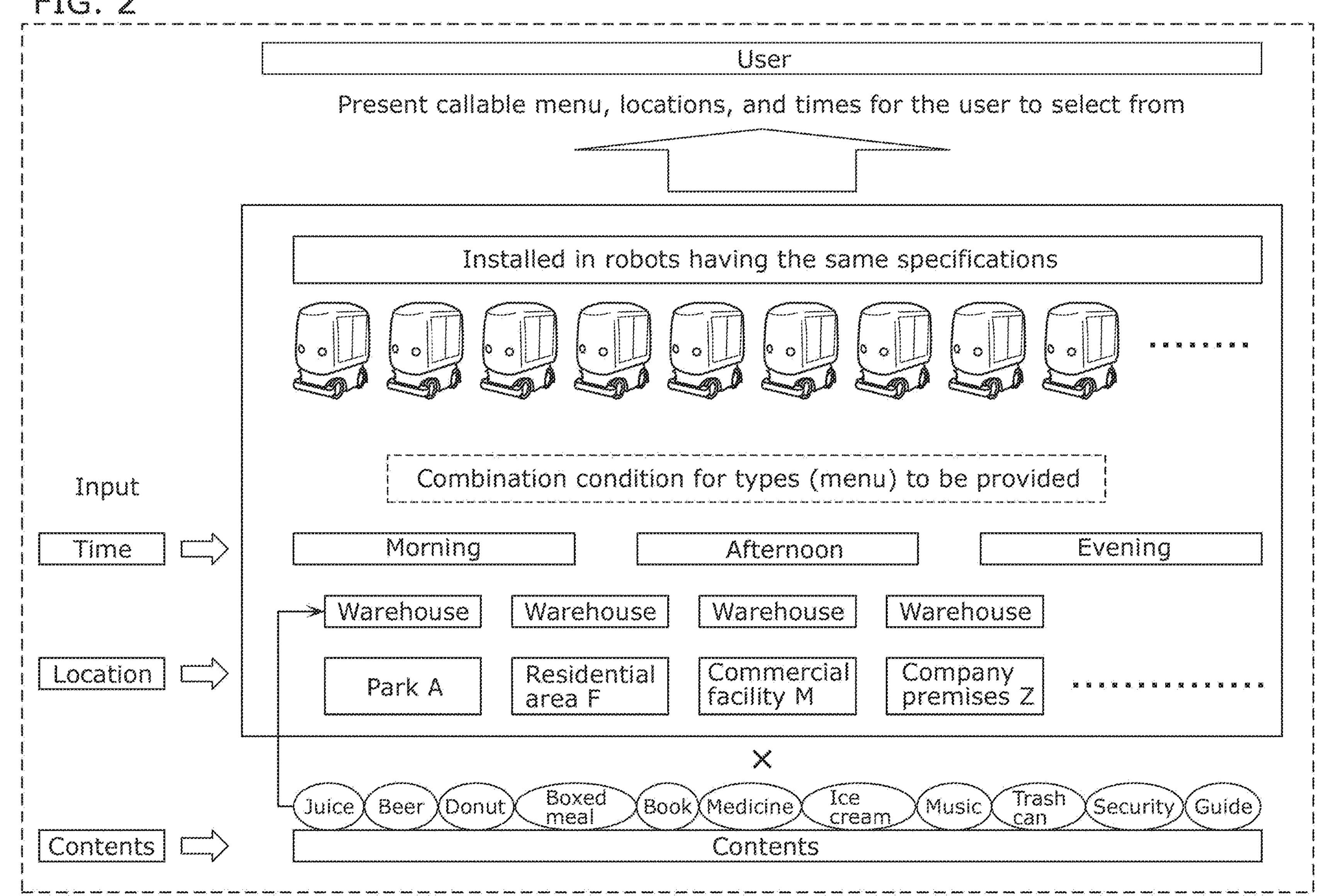
FIG. 2
User
Present callable menu, locations, and times for the user to select from
Installed in robots having the same specifications
Combination condition for types (menu) to be provided
Input
Time
Location
Contents
Morning
Afternoon
Evening
Warehouse
Warehouse
Warehouse
Warehouse
Park A
Residential area F
Commercial facility M
Company premises Z
Juice
Beer
Donut
Boxed meal
Book
Medicine
Ice cream
Music
Trash can
Security
Guide
Contents

FIG. 3

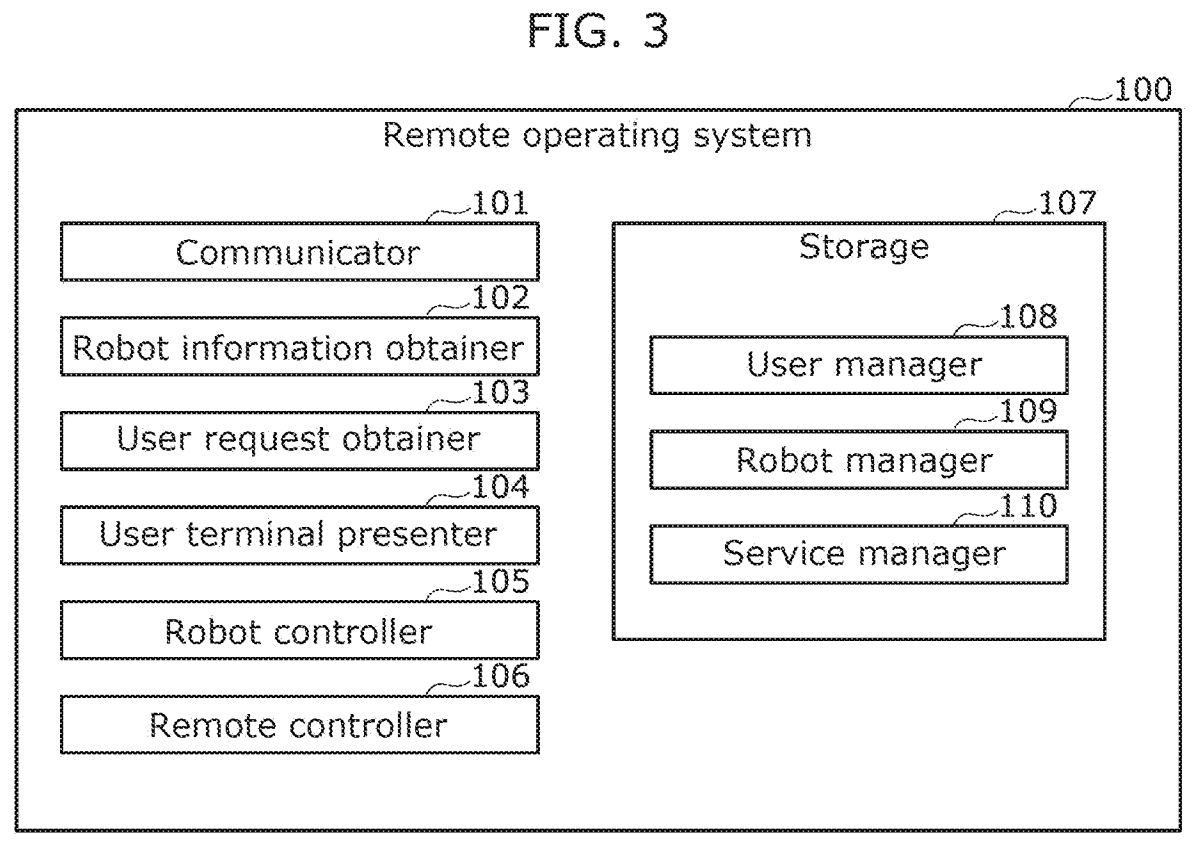

100 Remote operating system

101 Communicator

102 Robot information obtainer

103 User request obtainer

104 User terminal presenter

105 Robot controller

106 Remote controller

107 Storage

108 User manager

109 Robot manager

110 Service manager

FIG. 4

| User ID | User terminal information | Attributes | | Preference 1 (food and beverage) | Preference 2 (hobby) | Service usage history |
|---|---|---|---|---|---|---|
| | | Age | Gender | | | |
| U001 | Address 1 | 20s | Male | Beer | Watching sports | 10/1 18:00 Draft-beer sales robot R001 |
| | | | | | | 10/8 14:00 Sports broadcast robot R003 |
| U002 | Address 2 | 10s | Female | Ice cream | Listening to music | 8/3 15:00 Ice-cream sales robot R004 |
| | | | | | | 11/10 13:00 Entertainment play robot R002 |
| ... | ... | ... | ... | ... | ... | ... |

FIG. 5

| Robot ID | Current location | Installed functions | Services provided | Status |
| --- | --- | --- | --- | --- |
| R001 | X1 degrees X1 minutes X1 seconds north latitude Y1 degrees Y1 minutes Y1 seconds east longitude | Camera, loudspeaker, microphone, cashier, beer server | Camera, loudspeaker, microphone, cashier | In operation |
| R002 | X2 degrees X2 minutes X2 seconds north latitude Y2 degrees Y2 minutes Y2 seconds east longitude | High-performance loudspeaker, display, play-command receiver, camera, cashier | Entertainment play | In operation |
| R003 | Waiting station | Camera, loudspeaker, microphone, cashier | Unavailable | On standby |
| ... | ... | ... | ... | ... |

FIG. 6

| Service ID | Service name | Essential functions | Provider robot ID | Intended receiver | Service season and hours | Service providing area |
|---|---|---|---|---|---|---|
| S001 | Sale of draft beer | Beer server, cashier | R001 | Aged 20 and up | All year<br>From 12:00 to 21:00 | Residential area A<br>Park B |
| S002 | Entertainment play | High-performance loudspeaker, display, play-command receiver | R002 | All ages | All year<br>From 10:00 to 20:00 | Park B |
| ... | ... | ... | ... | ... | ... | ... |

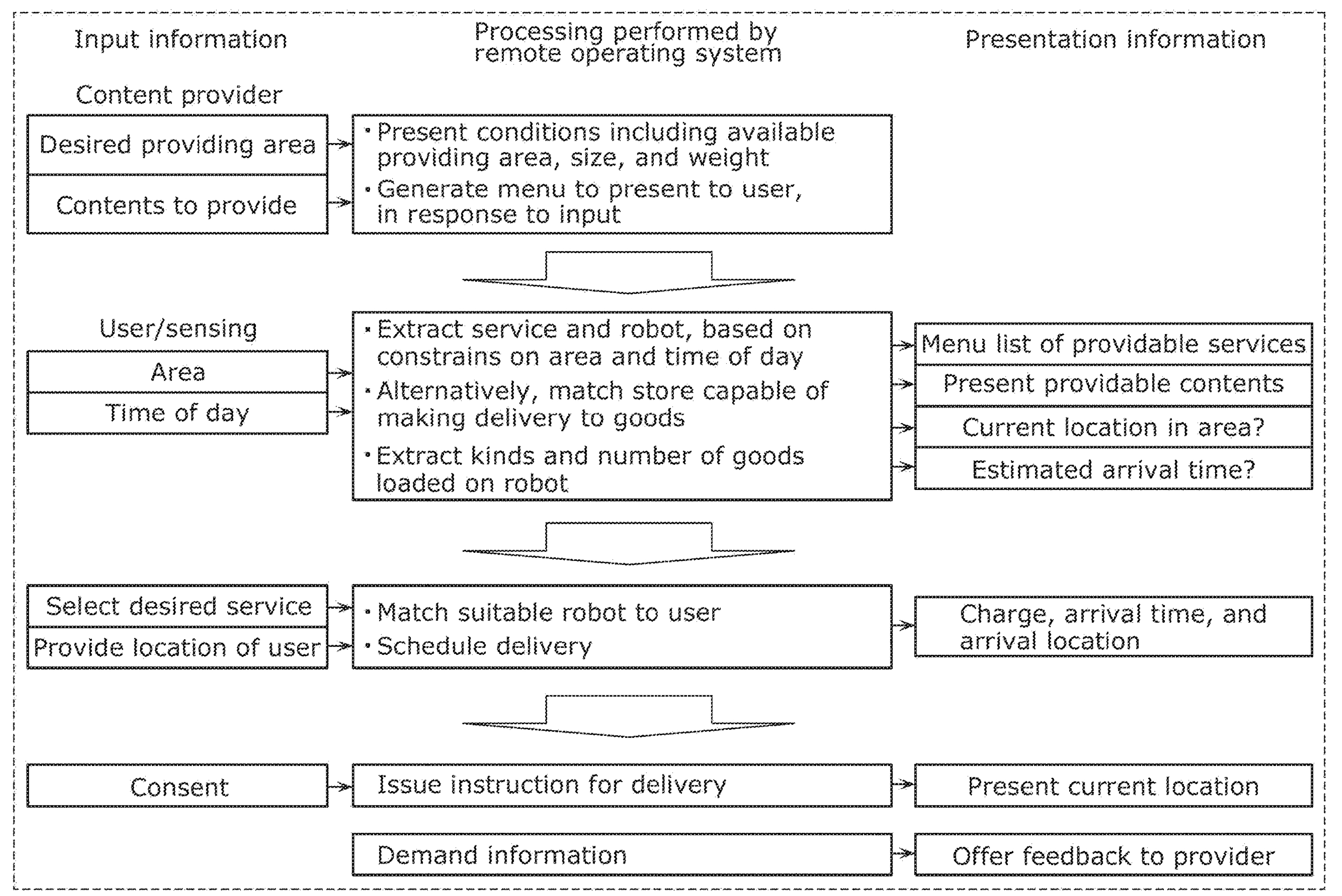
FIG. 11
Input information
Processing performed by remote operating system
Presentation information
Content provider
Desired providing area
Contents to provide
· Present conditions including available providing area, size, and weight
· Generate menu to present to user, in response to input
User/sensing
Area
Time of day
· Extract service and robot, based on constrains on area and time of day
· Alternatively, match store capable of making delivery to goods
· Extract kinds and number of goods loaded on robot
Menu list of providable services
Present providable contents
Current location in area?
Estimated arrival time?
Select desired service
Provide location of user
· Match suitable robot to user
· Schedule delivery
Charge, arrival time, and arrival location
Consent
Issue instruction for delivery
Present current location
Demand information
Offer feedback to provider

FIG. 14

| Robot type | Function | Necessary information | Source of obtainment | Processing details |
| --- | --- | --- | --- | --- |
| Security robot | Anomaly detection | · Image of surroundings of robot<br>· Anomalous-event management information | · Robot<br>· Service manager | Detect anomalous event from image information |
| Security robot | Response to anomaly detection | Predetermined contact information | Service manager | Send notification to predetermined contact after anomaly detection |
| ... | ... | ... | ... | ... |

FIG. 15

| Robot type | Source of obtainment | Timing of obtainment | Information obtained | Detection | Processing details |
|---|---|---|---|---|---|
| Beverage sales robot | Entertainment robot | In service | Image information | Crowd of people | Determine whether to dispatch robot to area near entertainment robot |
| Cleaning robot | Entertainment robot | Currently moving, in service | Image information<br>Imaging location information | Trash | Determine whether to dispatch robot to area containing trash detected |
| ... | ... | ... | ... | ... | ... |

INFORMATION OUTPUT METHOD AND INFORMATION OUTPUT DEVICE

CROSS REFERENCE TO RELATED APPLICATIONS

This is a continuation application of PCT International Application No. PCT/JP2022/013188 filed on Mar. 22, 2022, designating the United States of America, which is based on and claims priority of U.S. Patent Application No. 63/176,544 filed on Apr. 19, 2021. The entire disclosures of the above-identified applications, including the specifications, drawings and claims are incorporated herein by reference in their entirety.

FIELD

The present disclosure relates to an information output method and an information output device.

BACKGROUND

As disclosed in Patent Literatures (PTLs) 1 and 2, systems that provide services using autonomous mobile robots and autonomous mobile robots that are suitable to implement such systems have been developed.

CITATION LIST

Patent Literature

PTL 1: Japanese Unexamined Patent Application Publication (Translation of PCT Application) No. 2019-516201

PTL 2: WO 2018/038080

SUMMARY

Technical Problem

Unfortunately, neither of the systems disclosed in PTLs 1 and 2 is intended to provide different types of services.

In response to this, it is an object of the present disclosure to provide an information output method that is capable of providing different types of services.

Solution to Problem

In accordance with an aspect of the present disclosure, in order to achieve the above-described object, an information output method used by an information output device includes: obtaining, from each of at least two autonomous mobile robots each providing at least one service, first information including (i) information about a location of the autonomous mobile robot and (ii) information about a service provided by the autonomous mobile robot; presenting, based on the first information, information about at least two services provided by the at least two autonomous mobile robots to a terminal device used by a user that receives service among the at least two services; obtaining, from the terminal device, second information including: a service providing location designated by the user to receive the service; and information about the service selected by the user; determining, based on the second information, one autonomous mobile robot providing the service selected by the user among the at least two autonomous mobile robots; and outputting, to the one autonomous mobile robot determined, first control information used for moving the one autonomous mobile robot to the service providing location.

In accordance with another aspect of the present disclosure, an information output device includes: a processor; and a memory, wherein the processor uses the memory to: obtain, from each of at least two autonomous mobile robots each providing at least one service, first information including information about a location of the autonomous mobile robot and information about a service provided by the autonomous mobile robot; present, based on the first information, information about at least two services provided by the at least two autonomous mobile robots to a terminal device used by a user that receives the service among the at least two services; obtain, from the terminal device, second information including: a service providing location designated by the user to receive the service; and information about the service selected by the user; determine, based on the second information, one autonomous mobile robot providing the service selected by the user among the at least two autonomous mobile robots; and output, to the one autonomous mobile robot determined, first control information used for moving the one autonomous mobile robot to the service providing location.

The general and specific aspects according to the above-described embodiment may be implemented to a system, a method, an integrated circuit, a computer program, or a computer-readable recording medium such as a Compact Disc-Read Only Memory (CD-ROM), or may be any combination of them.

Advantageous Effects

An information output method and an information output device according to the present disclosure are capable of providing different types of services.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 2 is a diagram illustrating an example of an operation performed by the service providing system according to Embodiment.

FIG. 3 is a block diagram illustrating an example of a functional configuration of a remote operating system.

FIG. 4 is a table illustrating an example of user information managed by a user manager.

FIG. 5 is a table illustrating an example of robot information managed by a robot manager.

FIG. 6 is a table illustrating an example of service information managed by a service manager.

FIG. 11 is a diagram illustrating processing performed by the remote operating system.

FIG. 14 is a diagram illustrating an example of information that defines processing performed by a robot according to Variation 1.

FIG. 15 is a diagram illustrating an example of information that defines processing performed by a robot according to Variation 2.

DESCRIPTION OF EMBODIMENT(S)

Figure 1:
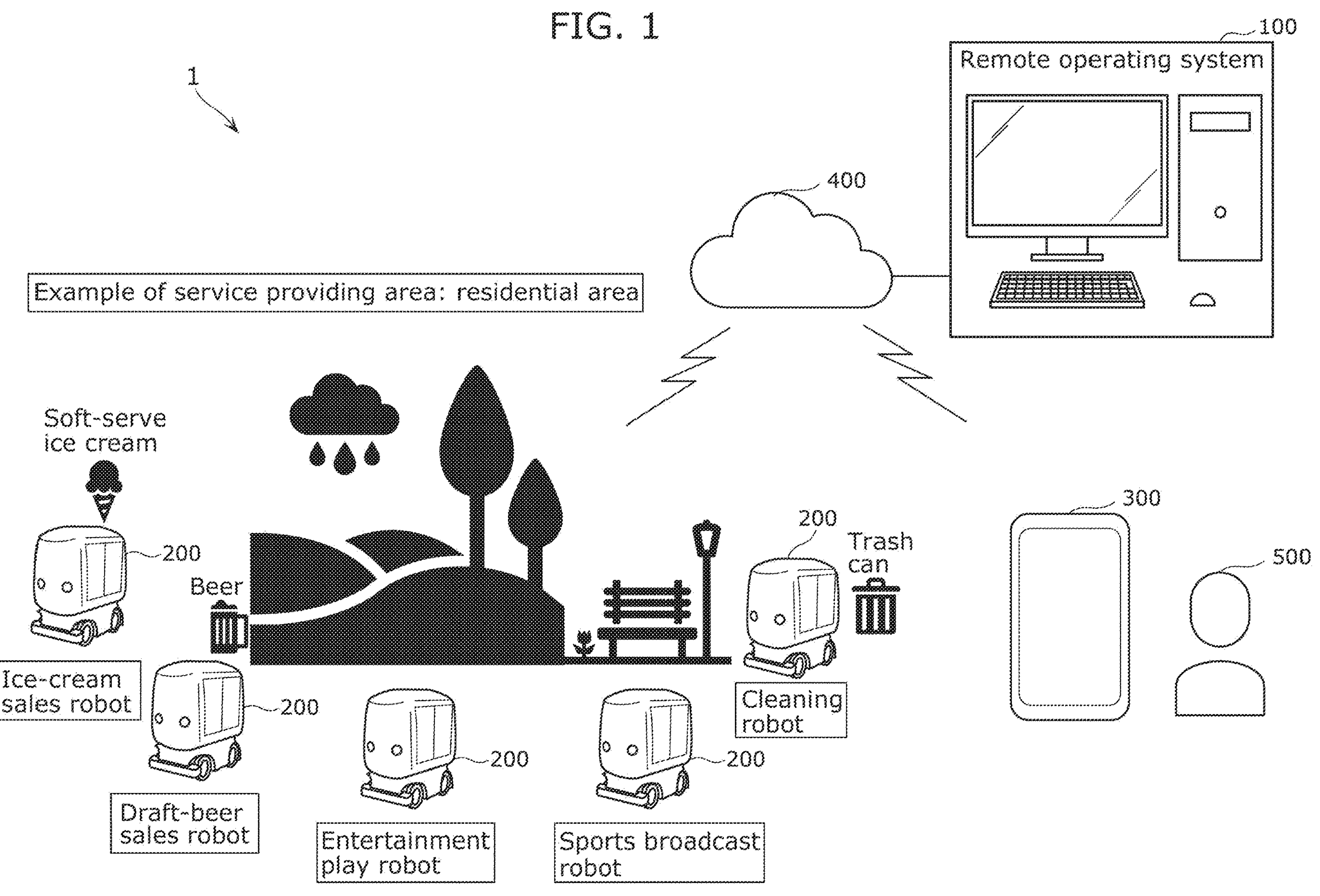
FIG. 1 is a diagram illustrating an overview of a service providing system according to Embodiment.

(Underlying Knowledge Forming Basis of the Present Disclosure)

Each of the systems disclosed in PTLs 1 and 2 provides a single type of service, such as delivery or sale. Thus, each of these systems is not intended to provide different types of services, such as sale, guidance, signage, and security.

For example, PTL 1 discloses the autonomous delivery vehicle that implements an autonomous mobile delivery robot. This autonomous delivery vehicle includes the mobile base unit and the delivery unit included in the mobile base unit. The delivery unit stores at least one item of goods during the delivery. Then, after the arrival of the delivery vehicle at a delivery location, a customer can take out the goods from the delivery unit.

PTL 2 discloses the mobile sales vehicle that travels to a predetermined location along a predetermined cyclic route or within a predetermined area to sell goods placed on its carrier at the location. This mobile sales vehicle takes orders for goods that the vehicle is carrying, via a network while traveling or while the carrier is open to sell the carried goods. Based on the received order, the mobile sales vehicle delivers the goods to the customer that placed the order.

The robot disclosed in PTL 1 transports mainly food, and the mobile sales vehicle disclosed in PTL 2 is used for mobile sale. More specifically, each of the robot and the mobile sales vehicle disclosed in PTLs 1 and 2 provides a single type of service, such as delivery or sale. Thus, neither of the robot and the mobile sales vehicle is intended to provide different types of services including sale, guidance, signage, and security. Thus, neither of these disclosures does not intend to simultaneously manage different types of robots that provide different services.

To be more specific, the conventional technology does not cover management on: locations of autonomous mobile robots; services providable by the autonomous mobile robots; how many or how much of what goods are being carried by the autonomous mobile robots; and which one of the autonomous mobile robots having which function should be dispatched or is available to be dispatched from the waiting station. Furthermore, the conventional technology does not consider letting the user know there is an autonomous mobile robot available to provide a desired service, or moving the autonomous mobile robot suitable for the service desired by the user to the location of the user.

The mobile sales vehicle disclosed in PTL 2 is operated by a person and is not implemented by an unmanned autonomous mobile robot. Thus, this mobile sales vehicle has no configuration that is required when services are provided using the unmanned autonomous mobile robot. To provide the services using the unmanned autonomous mobile robot, sale instructions are to be remotely given to the unmanned autonomous mobile robot. Moreover, the unmanned autonomous mobile robot needs to interact with customers and manage payments received from the customers. Furthermore, content to be distributed needs to be changed according to locations that the unmanned autonomous mobile robot moves to and types of people around the robot.

The following describes the information output method and the information output device according to an aspect of the present disclosure in detail with reference to the Drawings.

The following embodiment is a specific example of the present disclosure. The numerical values, shapes, materials, elements, arrangement and connection configuration of the elements, steps, the order of the steps, etc., described in the following embodiment are merely examples, and are not intended to limit the present disclosure. Among elements in the following embodiment, those not described in any one of the independent claims indicating the broadest concept of the present disclosure are described as optional elements.

Embodiment

FIG. 1 is a diagram illustrating an overview of a service providing system according to Embodiment. FIG. 2 is a diagram illustrating an example of an operation performed by the service providing system according to Embodiment.

As illustrated in these diagrams, service providing system 1 includes remote operating system 100, a plurality of autonomous mobile robots 200, and terminal device 300. Remote operating system 100, the plurality of autonomous mobile robots 200, and terminal device 300 are communicatively connected to each other via communication network 400.

For example, remote operating system 100 provides different types of services using the plurality of autonomous mobile robots 200 in an area (a service providing area) where the services are provided, such as a residential area. As illustrated as contents by example in FIG. 2, the different types of services include: providing goods, such as juice, beer, donut, boxed meal (Japanese "bento"), book, medicine, and ice cream; and providing labor services, such as music, trash can, security, and guidance. Remote operating system 100 presents the different types of services providable in the service providing area, to terminal device 300.

Remote operating system 100 is a computer system that is located inside or outside the service providing area and that remotely monitors and controls autonomous mobile robot 200 used for providing contents. In the event of an emergency, such as a malfunction of autonomous mobile robot 200, remote operating system 100 performs control to enable, for example, a conversation between a user and a remote operator. The remote monitoring and control may be performed by a service provider or a third party that conducts a business of remote monitoring and control.

User 500 operates terminal device 300 to select a desired service from among the different types of services presented to terminal device 300. Terminal device 300 transmits information indicating the selected service to remote operating system 100. At this time, terminal device 300 may receive an input about a location and time scheduled to receive the service and then transmit information indicating the location and time to remote operating system 100.

Based on the information received from terminal device 300, remote operating system 100 determines the service desired by user 500 and also determines autonomous mobile robot 200 capable of providing this service from among the plurality of autonomous mobile robots 200. Then, remote operating system 100 controls autonomous mobile robot 200 determined, and causes autonomous mobile robot 200 to provide user 500 with the service desired by user 500.

Here, the contents provided for the user by the service provider using autonomous mobile robot 200 are goods or labor services. The contents can vary depending on the business type of the service provider and vary in the handling, kind, and attribute of materials to be provided. The contents include tangible goods transported by autonomous mobile robot 200. Examples of such goods include beverages (such as juice and beer), foods (such as donuts, boxed meals, and ice cream), and information media (such as books). Furthermore, the contents include intangible services provided using the function or configuration of autonomous mobile robot 200. Examples of such services include installations (such as trash cans) in the service providing area, information (such as music and advertisements) played in the service providing area, and labor services (such as securities, guides, and interpreters) provided in the service providing area.

FIG. 2 illustrates characteristics of the locality of the service providing area, in which the user is to be provided with the contents. The characteristics include: the kind of the service providing area (such as park, residential area, commercial facility, or company premises); the location of the service providing area; and an event or the like held in the service providing area. The characteristics of the service providing area may include span of time (morning, afternoon, or evening), season, and weather.

[Configuration of Remote Operating System 100]

Next, the functional configuration of remote operating system 100 is described. FIG. 3 is a block diagram illustrating an example of the functional configuration of the remote operating system. Remote operating system 100 includes communicator 101, robot information obtainer 102, user request obtainer 103, user terminal presenter 104, robot controller 105, remote controller 106, and storage 107. For example, remote operating system 100 includes a computer. Remote operating system 100 is an example of an information output device.

Communicator 101 communicates with external devices, such as terminal device 300 and autonomous mobile robot 200. Communicator 101 may be connected to communication network 400 via wired or wireless communication.

Robot information obtainer 102 obtains, from each of the plurality of autonomous mobile robots 200, robot information including: the location of autonomous mobile robot 200; the remaining charge of a battery included in autonomous mobile robot 200; and the stock statuses of service materials to be provided by autonomous mobile robot 200. Robot information obtainer 102 may obtain the robot information periodically.

User request obtainer 103 obtains information about a request from user 500, from terminal device 300 of user 500. The request from the user includes a service desired by user 500 and a location and time to receive this service.

Based on the robot information and the user information, user terminal presenter 104 generates presentation information for presenting, to terminal device 300, the different types of services providable in the service providing area. Then, user terminal presenter 104 transmits the presentation information to terminal device 300. As a result, user terminal presenter 104 allows terminal device 300 to display the presentation information.

Based on the request from user 500 obtained by user request obtainer 103, robot controller 105 determines autonomous mobile robot 200 capable of providing the service included in the request from among the plurality of autonomous mobile robots 200. Then, robot controller 105 transmits control information used for providing the service to autonomous mobile robot 200 determined. For example, the control information is used for moving the determined autonomous mobile robot 200 to the location where the service is provided to user 500. The location where the service is provided may be designated by user 500 or may be already detected by terminal device 300 of user 500. Alternatively, the location may be scheduled in advance for autonomous mobile robot 200 to provide the service.

Remote controller 106 receives an input from the remote operator to remotely monitor and control autonomous mobile robot 200. Remote controller 106 also presents, to the remote operator, sensing data that is obtained by a sensor included in autonomous mobile robot 200 and then transmitted from autonomous mobile robot 200. If autonomous mobile robot 200 is unable to autonomously make a determination while moving or providing the service, remote controller 106 receives an input operation from the remote operator. Then, by transmitting a control signal based on the received operation to autonomous mobile robot 200, remote controller 106 remotely controls autonomous mobile robot 200.

Storage 107 stores various pieces of information. Storage 107 includes user manager 108, robot manager 109, and service manager 110. User manager 108 manages, for example, the location, attributes, and preferences of user 500. User manager 108 manages a user identification (ID) that identifies the user and a terminal ID of the terminal device of the user. The location of the user may be obtained by receiving location information of the terminal device owned by the user, from the terminal device. The location of the user may be periodically received from the terminal device. Alternatively, the location may be periodically received from the terminal device while the terminal device is executing an application to receive the service through service providing system 1. The user information, which includes the attributes and preferences of the user, the user ID, and the terminal ID, may have been entered by the user using the terminal device or a different device at the time of user registration with remote operating system 100. Thus, the user information may have been included in information transmitted to remote operating system 100 at the time of the user registration.

Robot manager 109 manages: the locations of the plurality of autonomous mobile robots 200; services providable by the plurality of autonomous mobile robots 200; functions installed in the plurality of autonomous mobile robots 200; and stock statuses of contents included in the plurality of autonomous mobile robots 200. Based on the robot information periodically obtained by robot information obtainer 102, robot manager 109 updates the location, providable services, functions, and stock statuses of the contents, for each of the plurality of autonomous mobile robots 200.

Service manager 110 manages service information that includes: a service receiver; an area and time to provide the service; and autonomous mobile robot 200 that provides the service.

Note that the information management includes holding the information for a predetermined period of time and updating the information to latest information when the latest information is received.

FIG. 4 is a table illustrating an example of the user information managed by the user manager.

The user information is generated for each user. As illustrated by example in FIG. 4, the user information includes user ID, user terminal information, attributes including age and gender, preference information including preferences 1 and 2, and service usage history. The user terminal information refers to an address of terminal device 300 to which the information is transmitted. The user terminal information may be information (such as a terminal ID) that identifies terminal device 300. Preference 1 indicates food or beverage preferred by the user, and preference 2 indicates a hobby of the user. The service usage history includes a type and time of the service received previously and a robot ID of autonomous mobile robot 200. Note that the service usage history is not limited to the example described above. For example, the service usage history may include an area where a service was provided previously, a time (of usage) when a service was provided previously, a service providing entity (or more specifically, a servicer) that provided a service previously, and an item of goods or service purchased previously.

The preference information may be obtained from a different service system used by the user. The preference information may be obtained, based on information (such as a history of online purchases) obtained through a different application of terminal device 300 of user 500. Alternatively, the preference information may be obtained not only from terminal device 300 of the user but also from a device (such as a home electrical appliance) used by the user.

FIG. 5 is a table illustrating an example of the robot information managed by the robot manager.

The robot information is generated for each of autonomous mobile robots 200. As illustrated by example in FIG. 5, the robot information includes robot ID, current location, installed functions, services provided, and status.

Note that a single autonomous mobile robot 200 may be set up to provide different types of services. For example, autonomous mobile robot 200 may be set up to provide cleaning and security services. In this case, autonomous mobile robot 200 may be set up to provide a service having a higher priority between these two types of services. For example, the cleaning service may be assigned a higher priority than the security service.

In this case, autonomous mobile robot 200 may perform cleaning as a usual operation and, in the security event, switch the service from cleaning to security. Autonomous mobile robot 200 may inform remote operating system 100 that the occurrence of the security event has caused the service to be switched from cleaning to security. When the security event is ended, autonomous mobile robot 200 may switch the service from security back to cleaning. Autonomous mobile robot 200 may also inform remote operating system 100 that the security event has ended and thus the service is switched from security back to cleaning. Autonomous mobile robot 200 may additionally install operating regulations (software) for providing the cleaning and security services on itself.

Robot manager 109 may manage details of the contents (such as names of goods), statuses of the contents (such as stock statuses), and charges for the contents. Information on the contents may be obtained from a system (not shown), such as a web marketplace that deals with the contents. Robot manager 109 may also manage the status of the battery included in autonomous mobile robot 200 (such as the remaining charge of the battery and the number of charge times).

FIG. 6 is a table illustrating an example of the service information managed by the service manager.

The service information is generated for each of the services provided by autonomous mobile robots 200. As illustrated by example in FIG. 6, the service information includes service ID, service name, essential functions, provider robot ID, intended receiver, service season and hours, and service providing area.

The essential functions are installed in autonomous mobile robot 200 previously registered by, for example, the service provider. An optional function, besides the essential functions, may be registered in the information managed by service manager 110. Autonomous mobile robot 200 having the optional function can provide an optional service.

The column for the intended receiver indicates a requirement that restricts users that receive the service. The service season and hours indicate days on which the service is provided and hours during which the service is provided on a day. The service providing area indicates an area in which the service is provided.

Note that a software function suitable for the hardware function of autonomous mobile robot 200 may be installed in autonomous mobile robot 200. The software that implements this software function may be previously managed by, for example, remote operating system 100.

[Configuration of Autonomous Mobile Robot 200]

Figure 7:
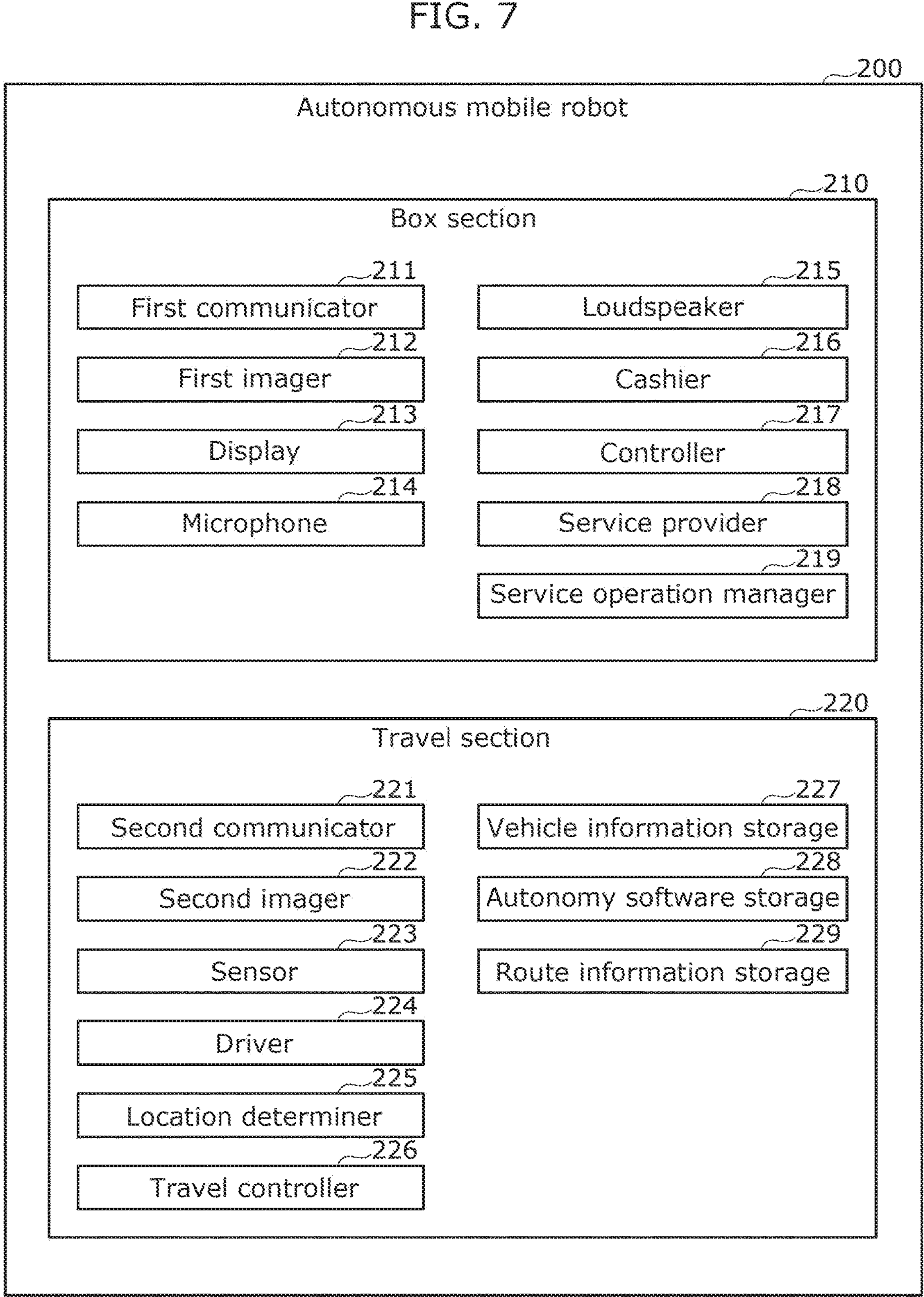
FIG. 7 is a block diagram illustrating an example of a functional configuration of an autonomous mobile robot.
Figure 8:
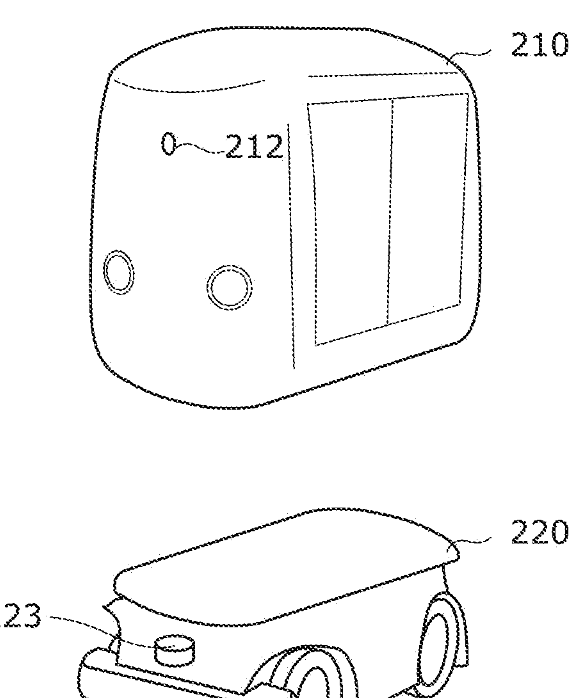
FIG. 8 illustrates an example of an external view of the autonomous mobile robot.

Next, the functional configuration of autonomous mobile robot 200 is described. FIG. 7 is a block diagram illustrating an example of the functional configuration of the autonomous mobile robot. FIG. 8 illustrates an example of an external view of the autonomous mobile robot.

Autonomous mobile robot 200 includes: box section 210 that implements the functions of providing the services; and travel section 220 that implements the function for autonomous travel. Travel sections 220 included in the plurality of autonomous mobile robots 200 have the same configuration. Box sections 210 included in the plurality of autonomous mobile robots 200 have different configurations according to the types of services to be provided.

(Box Section 210)

Box section 210 includes first communicator 211, first imager 212, display 213, microphone 214, loudspeaker 215, cashier 216, controller 217, service provider 218, and service operation manager 219.

First communicator 211 communicates with an external device, such as remote operating system 100. For example, first communicator 211 transmits information about services, such as stock statuses of goods in box section 210, to remote operating system 100. First communicator 211 may periodically transmit log information obtained as a result of operation of box section 210 to remote operating system 100. The log information includes an image captured by first imager 212, sound picked up by microphone 214, payment information obtained by cashier 216, a result of processing performed by controller 217, and a provision record of service provider 218.

First imager 212 is a camera used in providing a service. To authenticate the user that receives the service, first imager 212 captures an image of an area, around autonomous mobile robot 200, in which the user is provided with the service. To conduct security or checking, first imager 212 may capture an image of the surroundings of autonomous mobile robot 200. The image (a moving image) captured by first imager 212 may be transmitted to remote operating system 100 by first communicator 211.

Display 213 displays information. For example, when the user is provided with a service, display 213 may display an advertisement, guidance, and information provided by the remote operator during a conversation between the user and the remote operator.

Microphone 214 obtains sounds around microphone 214. For example, microphone 214 may obtain a voice of the user when the service is provided for the user. For example, microphone 214 may be used to enable a conversation between the remote operator of remote operating system 100 and the user that uses autonomous mobile robot 200.

Loudspeaker 215 outputs sounds to the surrounding area of autonomous mobile robot 200. For example, when the service is provided for the user, loudspeaker 215 may reproduce music and output the music reproduced. Furthermore, loudspeaker 215 may be used for outputting a voice of the remote operator of remote operating system 100 during a conversation between the remote operator and the user.

Cashier 216 receives a payment for the service provided by autonomous mobile robot 200. For example, cashier 216 may receive the payment in exchange for the service from terminal device 300 of user 500. Alternatively, cashier 216 may receive the payment in exchange for the service with a credit card of user 500.

Controller 217 performs control to provide the service for user 500. For example, when user 500 receives the purchased item of goods, controller 217 may perform control to open and close the lid of a box that contains the item. Controller 217 may perform control when user 500 takes out the item designated by user 500. Furthermore, controller 217 may perform control when the contents are displayed on display 213.

Service provider 218 provides, for user 500, a service predetermined for autonomous mobile robot 200. To sell ice cream, service provider 218 takes out the ice cream from a freezer that contains the ice cream and provides the ice cream to the user. To sell a beverage, such as draft beer, service provider 218 pours the beverage into a container from a drink server and then provides the beverage to the user. To provide content, service provider 218 displays an image included in the content on the display and outputs sound included in the content from the loudspeaker. To perform cleaning, service provider 218 picks up trash in a service providing location and collects trash from a trash can. To conduct security, service provider 218 may capture an image of the surroundings of autonomous mobile robot 200 with a camera used for capturing the surroundings, and may transmit image data obtained to remote operating system 100 via first communicator 211. Alternatively, service provider 218 may detect a suspicious person based on the image data obtained and transmit a result of the detection to remote operating system 100.

Service operation manager 219 manages operation information that defines an operation of autonomous mobile robot 200 performed while the service is being provided. Autonomous mobile robot 200 operates according to the operation information. The operation information may be different for each type of service. For example, the operation information may define an operation (such as speaking) performed for user 500 when autonomous mobile robot 200 arrives at the service providing location.

Furthermore, service operation manager 219 manages software as the operation information that defines an operation performed, during the service, by autonomous mobile robot 200 that includes service operation manager 219. Such software is defined for each type of service to be provided.

For example, the information stored in service operation manager 219 of autonomous mobile robot 200 that sells draft beer may define four operations as follows. A first operation is to move to a location of sale, based on moving route information received from remote operating system 100. A second operation is to say "Welcome" upon detection of the user in front of autonomous mobile robot 200. A third operation is to perform payment processing (such as touch payment) based on a selection made by the user. A fourth operation is to pour the selected amount of beer into a mug from a beer server. For example, the fourth operation is to control the beer server so that, when the user pours the beer into the mug, the defined amount of beer is poured into the mug.

(Travel Section 220)

Travel section 220 includes second communicator 221, second imager 222, sensor 223, driver 224, location determiner 225, travel controller 226, vehicle information storage 227, autonomy software storage 228, and route information storage 229.

Second communicator 221 communicates with an external device, such as remote operating system 100. For example, second communicator 221 may transmit, to remote operating system 100, obstacle information indicating an obstacle detected while autonomous mobile robot 200 is traveling. Moreover, second communicator 221 may also receive the route information indicating a route to be taken by autonomous mobile robot 200 and information about an obstacle in the route, from remote operating system 100. Furthermore, second communicator 221 may periodically transmit, to remote operating system 100, an image captured by second imager 222, sensing information obtained by sensor 223, and log information, including a result of processing performed by travel controller 226, obtained as a result of operation of travel section 220.

Second imager 222 is a camera used while autonomous mobile robot 200 is traveling. For example, second imager 222 may capture an image of an obstacle or object, and then may detect the obstacle or object from this image or identify the obstacle or object detected.

Sensor 223 is used while autonomous mobile robot 200 is traveling. Sensor 223 includes a millimeter wave sensor and a light detection and ranging (LiDAR) sensor that detect an obstacle. Furthermore, sensor 223 includes an acceleration sensor for detecting a traveling speed of autonomous mobile robot 200 and an angular rate sensor for detecting a traveling direction of autonomous mobile robot 200.

Driver 224 causes autonomous mobile robot 200 to travel. Driver 224 includes wheels and a motor (an engine) that causes the wheels to rotate. Driver 224 may include a steering wheel for changing the direction of the wheels.

Location determiner 225 determines the location of autonomous mobile robot 200 by receiving signals from global positioning system (GPS) satellites. The location of autonomous mobile robot 200 determined by location determiner 225 may be periodically transmitted to remote operating system 100 by second communicator 221.

Travel controller 226 controls driver 224 so that autonomous mobile robot 200 autonomously travels according to a moving route and basic software. The basic software is a program that enables autonomous travel by the moving route without any collision with an obstacle or object, based on the location determined by location determiner 225 and the result of the detection by second imager 222 and sensor 223. Travel controller 226 may control driver 224, based on a remote control signal from remote operating system 100.

Vehicle information storage 227 stores basic information on, for example, the functions of autonomous mobile robot 200. The basic information includes information on the functions of autonomous mobile robot 200 that indicates kinds of input devices and kinds of output devices included in autonomous mobile robot 200. The input devices are the various sensors. The output devices are: an actuator including a motor; the display; and the loudspeaker. The basic information may include information about the services provided by autonomous mobile robot 200.

Autonomy software storage 228 stores the basic software that enables autonomy travel.

Route information storage 229 stores the route information indicating the moving route. The route information may be received by second communicator 221 from remote operating system 100.

Note that second communicator 221 need not be included in travel section 220, and may be implemented by first communicator 211. Second imager 222 need not be included in travel section 220, and may be implemented by first imager 212. The information stored in box section 210 and travel section 220 may be stored in either box section 210 or travel section 220. For example, service operation manager 219 need not be included in box section 210, and may be included in travel section 220.

As illustrated in FIG. 8, autonomous mobile robot 200 includes box section 210 and travel section 220 that are detachable. Replacement with a different box section 210 allows autonomous mobile robot 200 to provide a service corresponding to this box section 210. Furthermore, autonomous mobile robot 200 may provide different types of services within the functional range of autonomous mobile robot 200. For example, autonomous mobile robot 200 may provide both the service of selling goods and the service of making rounds.

[Configuration of Terminal Device 300]

Figure 9:
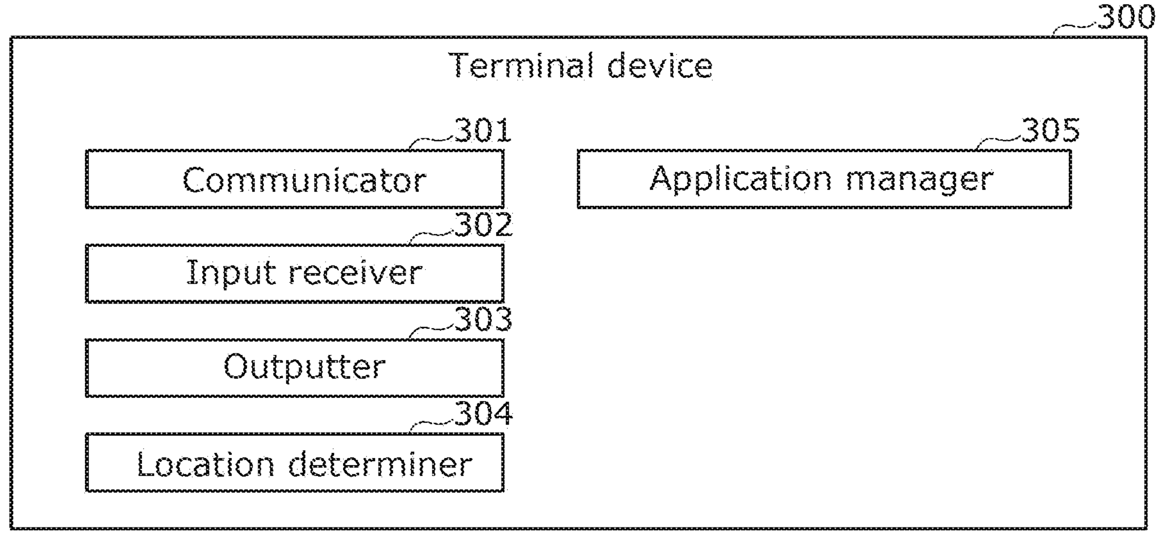
FIG. 9 is a block diagram illustrating an example of a functional configuration of a terminal device.

Next, the functional configuration of terminal device 300 is described. FIG. 9 is a block diagram illustrating an example of the functional configuration of the terminal device.

Terminal device 300 includes communicator 301, input receiver 302, outputter 303, location determiner 304, and application manager 305. For example, terminal device 300 is a transportable computer, such as a smartphone or a tablet terminal.

Communicator 301 communicates with an external device, such as remote operating system 100. Communicator 301 transmits information used for the user registration and a request from the user, to remote operating system 100. Communicator 301 also receives, from remote operating system 100, the information on autonomous mobile robot 200 that is scheduled to provide the service. The information used for the user registration includes the user ID that identifies the user, the terminal ID that identifies terminal device 300 owned by the user, the attributes of the user, and the preferences and hobby of the user. Attribute information on the user includes the age, gender, and family structure of the user. For example, communicator 301 may be connected to communication network 400 via wireless communication.

Input receiver 302 receives an input from user 500. For example, input receiver 302 receives an input performed by the user to select a desired service from among a plurality of candidate services that are presented by outputter 303 as being providable by autonomous mobile robot 200. Input receiver 302 may be a touch panel, for example. Input receiver 302 may receive a voice input from the user. Input receiver 302 may be a microphone, for example.

Outputter 303 presents information to the user. For example, outputter 303 presents the plurality of candidate services obtained from remote operating system 100 as being providable by autonomous mobile robot 200. Outputter 303 may be a display that displays a graphical user interface (GUI) including the plurality of the candidate services. Alternatively, outputter 303 may be a loudspeaker that presents the plurality of candidates by voice.

Location determiner 304 determines the location of terminal device 300 by receiving signals from GPS satellites. The location of terminal device 300 determined by location determiner 304 may be periodically transmitted to remote operating system 100 by communicator 301.

Application manager 305 manages an application used for receiving the service provided by autonomous mobile robot 200. The application managed by application manager 305 is executed by terminal device 300. This causes outputter 303 of terminal device 300 to present autonomous mobile robots 200 received from remote operating system 100 as the candidates to provide the service. Furthermore, this causes communicator 301 to transmit the information entered using input receiver 302 of terminal device 300 to remote operating system 100.

[Operation of Remote Operating System]

Figure 10:
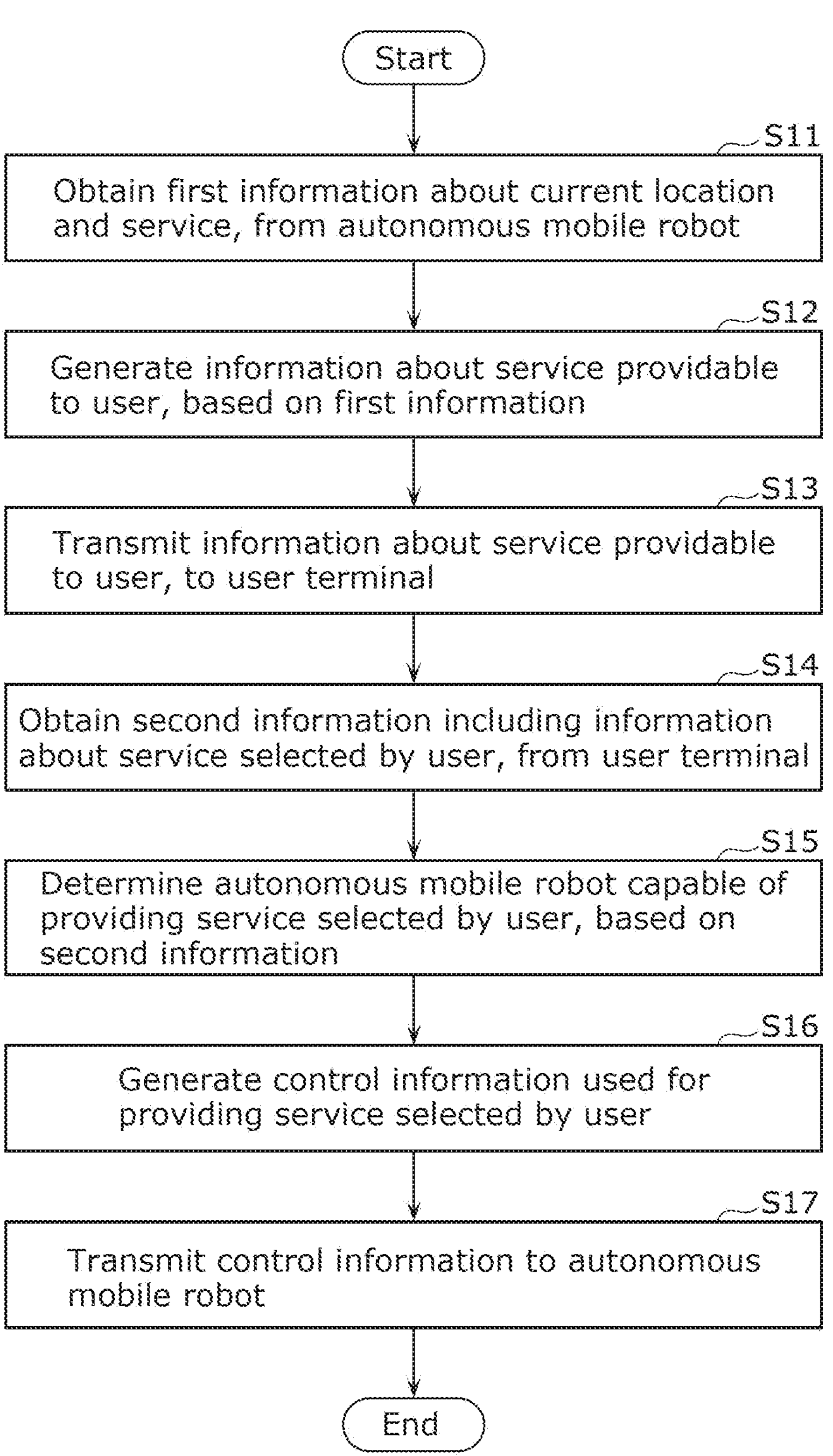
FIG. 10 is a flowchart of an example of an operation performed by the remote operating system according to Embodiment.

Next, the operation of remote operating system 100 is described. FIG. 10 is a flowchart of an example of the operation performed by the remote operating system according to Embodiment.

Remote operating system 100 obtains, from each of the plurality of autonomous mobile robots 200, first information including information about the current location of autonomous mobile robot 200 and a service provided by autonomous mobile robot 200 (S1). Step S1 is executed by robot information obtainer 102 of remote operating system 100. The first information obtained is stored into robot manager 109 and service manager 110 of storage 107.

The first information is generated by autonomous mobile robot 200. Thus, the first information is about autonomous mobile robot 200 that generates this first information. The first information includes a type and status of the service provided by autonomous mobile robot 200 that generates this first information. Examples of the type of the service include: sale of ice cream; sale of beverage, such as draft beer; provision of content; cleaning; and security. Examples of the status of the service include: in operation; out of service; and in preparation (such as replenishing goods or under maintenance).

The first information includes service information generated corresponding to autonomous mobile robot 200. The first information may also include detailed information on the services to be provided. Examples of the detailed information on the services to be provided may include the types of the providable services, goods, content, specifics of goods (names and brands of the goods), specifics of content (names of content), and the stock statuses of the goods.

The first information may be periodically obtained. Alternatively, the first information may be obtained in response to a request transmitted by remote operating system 100 to the plurality of autonomous mobile robots 200 for the first information. Remote operating system 100 may periodically obtain only information (for example, the status of the service) that dynamically changes in the first information. After once obtaining static information that does not dynamically change in the first information, remote operating system 100 need not obtain the static information again.

A source from which remote operating system 100 obtains the first information is not limited to autonomous mobile robot 200. Remote operating system 100 may obtain the first information via a terminal owned by a service administrator, for example.

Next, based on the first information, remote operating system 100 generates information on the plurality of services provided to user 500 by the plurality of autonomous mobile robots 200 (hereafter, this information is referred to as "service-related information" (S2). Step S2 is executed by user terminal presenter 104 of remote operating system 100.

The service-related information includes types of services that are providable by the plurality of autonomous mobile robots 200 that are in the service status of "in operation". The service-related information is an example of third information. The service-related information may further include: intended receiver of the service; service providable area; service season or hours; location information of autonomous mobile robot 200 that is in the status of "in operation"; and detailed information on the service provided by autonomous mobile robot 200 that is in the status of "in operation".

Although the service-related information is generated primarily by remote operating system 100, this is not intended to be limiting. The service-related information may be generated in response to a request transmitted from terminal device 300 that receives an operation performed by user 500 to request for the service-related information. In this case, information on the services providable for user 500 may be transmitted to terminal device 300 owned by user 500.

The request for the service-related information may include location information indicating the current location of terminal device 300 of user 500. If the location information is included in the request for the service-related information, a menu list of services providable in the service providing area including the current location of terminal device 300 may be generated as the service-related information.

Furthermore, the service-related information may include: at least one providable service; and robot location information indicating the current location of at least one autonomous mobile robot 200 corresponding to the at least one service. Note that if the location information has been obtained from terminal device 300 of user 500, the service-related information may include the location information of terminal device 300. Thus, the device that obtains the service-related information can determine a positional relationship between the at least one autonomous mobile robot 200 and terminal device 300 of user 500.

Furthermore, remote operating system 100 may calculate time required for autonomous mobile robot 200 to move to the current location of user 500, based on the location information of terminal device 300 of user 500 and the location information of the at least one autonomous mobile robot 200 corresponding to the providable services. For example, based on the location information of terminal device 300 of user 500 and the location information of the at least one autonomous mobile robot 200 corresponding to the providable services, remote operating system 100 may: determine a moving route that is to be taken by autonomous mobile robot 200 to reach the current location of user 500; determine a distance of this moving route; and then calculate the time required to move along the moving route at a predetermined traveling speed. Note that, in addition to the required time, remote operating system 100 may also calculate an estimated arrival time by adding the required time to the current time.

Furthermore, remote operating system 100 determines a location where the service is scheduled to be provided for user 500 by autonomous mobile robot 200. Note that the service-related information may include this scheduled location where the service is to be provided.

Here, the scheduled location where the service is to be provided may be the current location of terminal device 300 of user 500 or a location between the current location of terminal device 300 of user 500 and the current location of autonomous mobile robot 200. The location between the current location of terminal device 300 of user 500 and the current location of autonomous mobile robot 200 may be settled on a halfway point of the moving route assumed to be taken by autonomous mobile robot 200 to reach the current location of terminal device 300. Alternatively, this location may be settled on a location, on the moving route, determined by a walking speed of user 500 and a traveling speed of autonomous mobile robot 200.

Furthermore, the service-related information may include a price of the service provided. The price may include: a charge of the service provided (such as a charge of food, beverage, goods, or content reproduction); and a travel cost required by autonomous mobile robot 200 to provide the service.

Furthermore, in addition to the types of services providable by the plurality of autonomous mobile robots 200 that are in the service status of "in operation", the service-related information may also include information indicating a type of service that is scheduled to start at some future time (for example, 30 minutes later).

Next, remote operating system 100 transmits the service-related information to terminal device 300 of user 500 (S3). Step S3 is executed by user terminal presenter 104 of remote operating system 100.

User terminal presenter 104 transmits the service-related information to terminal device 300 of user 500, using the user terminal information (such as the terminal ID) managed by user manager 108. The user terminal information managed by user manager 108 is obtained from terminal device 300 of user 500 at the time of the user registration, for example.

User terminal presenter 104 may obtain the location information indicating the current location from each of a plurality of terminal devices 300 of a plurality of users 500. In this case, user terminal presenter 104 may transmit the service-related information to all terminal devices 300 located in the service providing area by multicasting or broadcasting.

Alternatively, user terminal presenter 104 may determine, based on the information registered in user manager 108, at least one user that is to receive the service-related information, and then transmit the service-related information only to the at least one user determined. The user that is to receive the service-related information may satisfy a requirement of the intended receiver of the service or have a preference or hobby matching the type of the service.

Note that although user terminal presenter 104 executes Step S3 after Step S2, this is not intended to be limiting. User terminal presenter 104 may first determine the user that is to receive the service-related information and then generate the service-related information intended for this user.

Next, remote operating system 100 obtains, from terminal device 300 of user 500, second information that includes the location of terminal device 300 and information about the service selected by user 500 (hereafter, referred to as the "user selection information") (S4). Step S4 is executed by user request obtainer 103 of remote operating system 100.

The second information is generated by terminal device 300. The user selection information included in the second information includes information indicating a service (such as sale of draft-beer) selected by user 500 using the GUI including the plurality of candidates presented by terminal device 300, for example. The user selection information may also include a desired location designated by the user to receive the service. The user selection information may indicate the service selected by the user or indicate the autonomous mobile robot selected by the user. The GUI presented by terminal device 300 may include a map of the service providing area and icons of the plurality of autonomous mobile robots 200 that each provide the plurality of services, the icons being superimposed upon the map. Terminal device 300 receives an input from user 500 selecting one of the plurality of autonomous mobile robots 200 displayed as the candidates on the GUI of terminal device 300. Then, terminal device 300 may generate the user selection information that includes at least one of: information indicating autonomous mobile robot 200 selected; and information indicating the service provided by this autonomous mobile robot 200.

Furthermore, the second information may also include times at which the user desires autonomous mobile robot 200 to start off for the location and arrive at the location. The desired arrival time may be indicated by time taken from the current time to the time when the service is provided.

Next, remote operating system 100 determines, based on the second information, one autonomous mobile robot 200 that is capable of providing the service selected by user 500 (S5). Step S5 is executed by robot communicator 105 of remote operating system 100.

Robot controller 105 extracts autonomous mobile robot 200 capable of providing the service selected by the user from among the plurality of autonomous mobile robots 200, using the information managed by robot manager 109. If more than one autonomous mobile robot 200 is capable of providing the service selected by the user, robot controller 105 determines one autonomous mobile robot 200 based on a predetermined condition.

The predetermined condition may be that autonomous mobile robot 200 be located closest to the service providing location desired by the user. Note that the service providing location desired by the user is the current location of terminal device 300 of user 500 or a location designated by user 500, for example. The predetermined condition may be that autonomous mobile robot 200 arrive earliest at the location desired by the user. The predetermined condition may be that autonomous mobile robot 200 have the widest variety of goods (that is, the largest number of kinds of goods). The predetermined condition may be that autonomous mobile robot 200 have a substantial amount of stock of goods. The predetermined condition may be any combination of at least two of the conditions described above.

Note that if the user selection information indicates that a specific autonomous mobile robot 200 is selected instead of a service, robot controller 105 determines this specifically-selected autonomous mobile robot 200 as the one autonomous mobile robot 200.

Next, remote operating system 100 generates the control information that enables the determined one autonomous mobile robot 200 to provide the service selected by the user (S6). Step S6 is executed by robot controller 105 of remote operating system 100.

Here, the control information is used for moving the determined one autonomous mobile robot 200 to the location designated by the user to receive the service. For example, the control information includes: route information indicating a route from the current location of autonomous mobile robot 200 to the location where the service is provided; and a control command to start moving.

Note that the route information indicating the route from the current location of autonomous mobile robot 200 to the location where the service is provided may be generated by remote operating system 100 using an existing route generation algorithm, for example. Alternatively, the route information may be generated by autonomous mobile robot 200. In this case, the route information may include the location where the service is provided and the control command to start moving.

Next, remote operating system 100 transmits the generated control information to the determined one autonomous mobile robot 200 (S7). Step S7 is executed by robot controller 105 of remote operating system 100.

To determine the one autonomous mobile robot 200, remote operating system 100 transmits the second information to a waiting-station management terminal (not shown) located in a waiting station of the plurality of autonomous mobile robots 200. Remote operating system 100 may manage the plurality of autonomous mobile robots 200 located separately at a plurality of waiting stations. In this case, the waiting-station management terminal may be placed in each waiting station to manage a plurality of autonomous mobile robots 200. Remote operating system 100 may determine the waiting station that is the closest to the service providing location designated by the user, based on the second information. Then, remote operating system 100 may transmit the second information to the waiting-station management terminal of the determined waiting station. The waiting-station management terminal that receives the second information determines whether the plurality of autonomous mobile robots 200 managed in the present waiting station include autonomous mobile robot 200 that provides the service indicated as being desired by the user in the user selection information included in the second information. Here, assume that the plurality of autonomous mobile robots 200 include: autonomous mobile robot 200 that provides a service different from the service desired by the user; and box section 210 that includes the function of providing the service desired by the user. In this case, it may be determined that the plurality of autonomous mobile robots 200 managed in the present waiting station include autonomous mobile robot 200 that provides the service desired by the user. More specifically, to provide the service desired by the user, box section 210 of autonomous mobile robot 200 that provides a service different from the service desired by the user may be replaced with box section 210 having the function of providing the service desired by the user.

If it is determined that the plurality of autonomous mobile robots 200 include autonomous mobile robot 200 that provides the service indicated as being desired by the user in the user selection information, remote operating system 100 may notify the user of: information on the selected one autonomous mobile robot 200; the estimated arrival time at which the selected one autonomous mobile robot 200 arrives at the service providing location; and the charge of the service to be provided.

If it is determined that the plurality of autonomous mobile robots 200 do not include autonomous mobile robot 200 that provides the service indicated as being desired by the user in the user selection information, remote operating system 100 may notify the user that autonomous mobile robot 200 that provides the service selected by user 500 is unavailable.

Note that the waiting-station management terminal may be a fixed terminal (such as a personal computer) installed in the waiting station or a mobile terminal (such as a tablet or a smartphone) that can be carried by an administrator present in the waiting station.

Remote operating system 100 is unable to obtain the robot information from autonomous mobile robot 200 that is not yet set up. On this account, remote operating system 100 may obtain the robot information on autonomous mobile robot 200 that is not yet set up, from the waiting-station management terminal.

The services provided by autonomous mobile robot 200 include: sale of foods and beverages, such as fresh juice, draft beer, donuts, rice balls, shaved ice, and ice cream; security; recyclable-trash collection; burnable-trash collection; guides and interpreters; signate; entertainment; and sale of balloons.

Example of Setup Before Start of Service

The service administrator determines the service providing area. Moreover, the service administrator finds a warehouse to store the plurality of autonomous mobile robots 200 and the stock of goods. The warehouse storing the plurality of autonomous mobile robots 200 is an example of the waiting station described above. The service administrator finds the warehouse (or more specifically, a local dark store) in or near the service providing area. The warehouse is used for performing the setup in order for the autonomous mobile robots to provide services and for loading the goods to be provided onto the autonomous mobile robots. The warehouse is also used as a waiting space of the autonomous mobile robots.

Furthermore, the service administrator procures the plurality of autonomous mobile robots 200 that provide the different types of services, from a robot business operator that manages robots. The service administrator also procures goods to be provided in the services, from providers of contents. Furthermore, the service administrator procures equipment and parts required in providing services, from an equipment company.

Furthermore, the service administrator performs the setup on autonomous mobile robot 200 according to the services to be provided. To be more specific, the service administrator installs equipment and parts required in providing the services onto box section 210 and loads the goods to be provided into box section 210. In this way, the service administrator performs hardware setup on autonomous mobile robot 200.

Furthermore, the service administrator performs software setup to define control over autonomous mobile robot 200 according to service specifications. In this way, the service administrator performs the software setup on autonomous mobile robot 200.

The service administrator transmits, to remote operating system 100 via a terminal (not shown) used by a provider, setup information including: information indicating the hardware installed on autonomous mobile robot 200; and information indicating the software installed on autonomous mobile robot 200. The setup information is managed by robot manager 109 and service manager 110 of remote operating system 100.

The service administrator performs setup so that detailed information on the services to be provided is presented to the user from a user application. The detailed information includes a providable-service menu list and providable contents.

The service administrator may use a matching system to solicit providers of contents that satisfy a predetermined condition. For example, the service administrator may set the following conditions. The conditions set by the service administrator include: a service providing area where autonomous mobile robot 200 is able to provide the services; the size of equipment and contents loadable on autonomous mobile robot 200; and the weight loadable on autonomous mobile robot 200. In response, a provider of contents may set desired conditions. The conditions set by the provider of contents include a service providing area, span of time during which the services are provided, and contents to be provided as service materials. The matching system matches the conditions set by the service administrator with the conditions desired by the provider of contents. Then, the service administrator may decide the provider of contents to deal with.

Example of Setup of User Application

User 500 obtains an application that enables the usage of services provided by autonomous mobile robot 200 from an application provider, using terminal device 300 owned by user 500. Then, user 500 installs the obtained application on terminal device 300. User 500 enters the attribute information (such as age and gender) of the user and the preference-hobby information of the user, via the application installed on terminal device 300. This causes terminal device 300 to transmit the information including the attribute information and the preference-hobby information for the user registration to remote operating system 100. The information for the user registration is managed by the user manager of the remote operating system. The attribute information and the preference-hobby information of the user may be obtained from a different system in which these pieces of information have already been registered.

The preference-hobby information of the user may be assumed from a usage history of other applications of the user terminal (for example, a purchase history, information on conversations on a social networking service (SNS), and histories of video-service viewing and Web browsing).

FIG. 11 is a diagram illustrating processing performed by the remote operating system.

When receiving an input about “desired providing area” and “contents to provide” from a content provider, remote operating system 100 presents the conditions about an available providing location, size, and weight. Then, remote operating system 100 generates a menu to present to the user, in response to the input.

When receiving an input about the area and the span of time from terminal device 300 of the user, remote operating system 100 extracts, based on constrains on the area and the span of time, the service and the autonomous mobile robot that provides the service. Remote operating system 100 may match a store capable of making delivery to goods. Remote operating system 100 may extract kinds and number of goods loaded on the autonomous mobile robot. Then, remote operating system 100 presents a providable-service menu list, providable contents, the area where the autonomous mobile robot is located, and the arrival time of the autonomous mobile robot at the service providing location.

When receiving an input about the selection of the desired service and the location of terminal device 300, remote operating system 100 matches the autonomous mobile robot suitable for the selected service to the user. Then, remote operating system 100 schedules the delivery of the service provided by the autonomous mobile robot. Remote operating system 100 may present the charge of the service to be provided, the arrival time, and the arrival location.

When receiving consent from the user, remote operating system 100 instructs the autonomous mobile robot make the delivery and presents the current location of the autonomous mobile robot. Remote operating system 100 may obtain demand information based on provision statuses of the services provided by the plurality of autonomous mobile robots, and then offer feedback to the provider.

Figure 12:
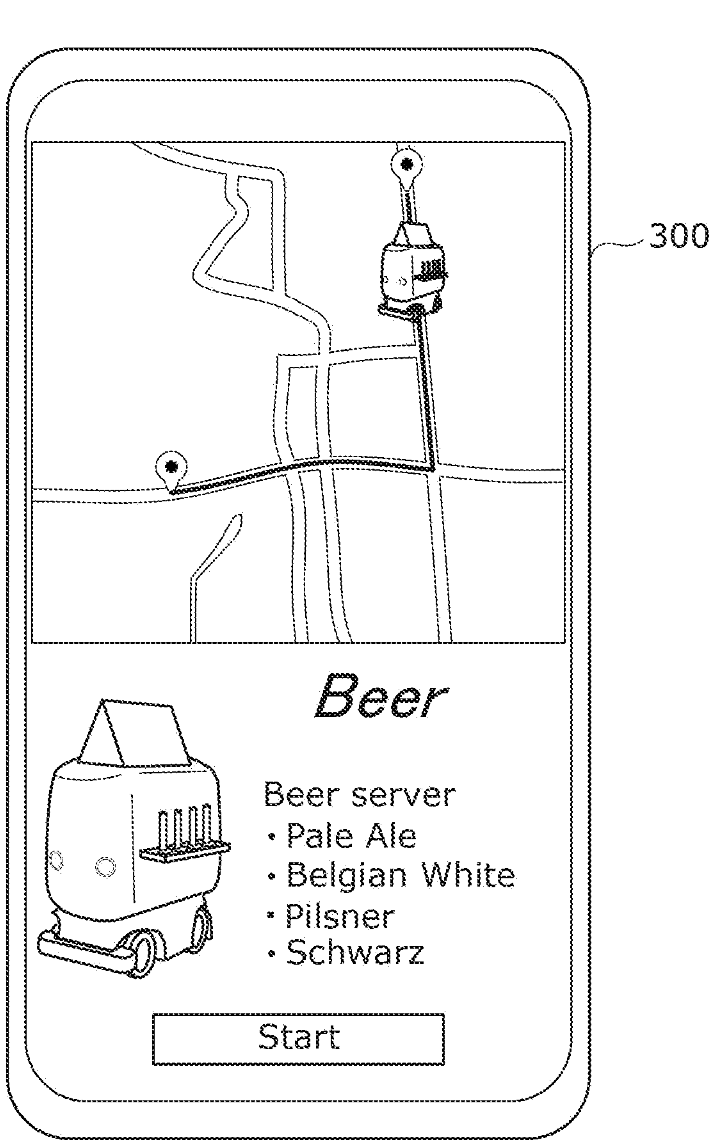
FIG. 12 illustrates an example of a displayed page presented on the terminal device.
Figure 13:
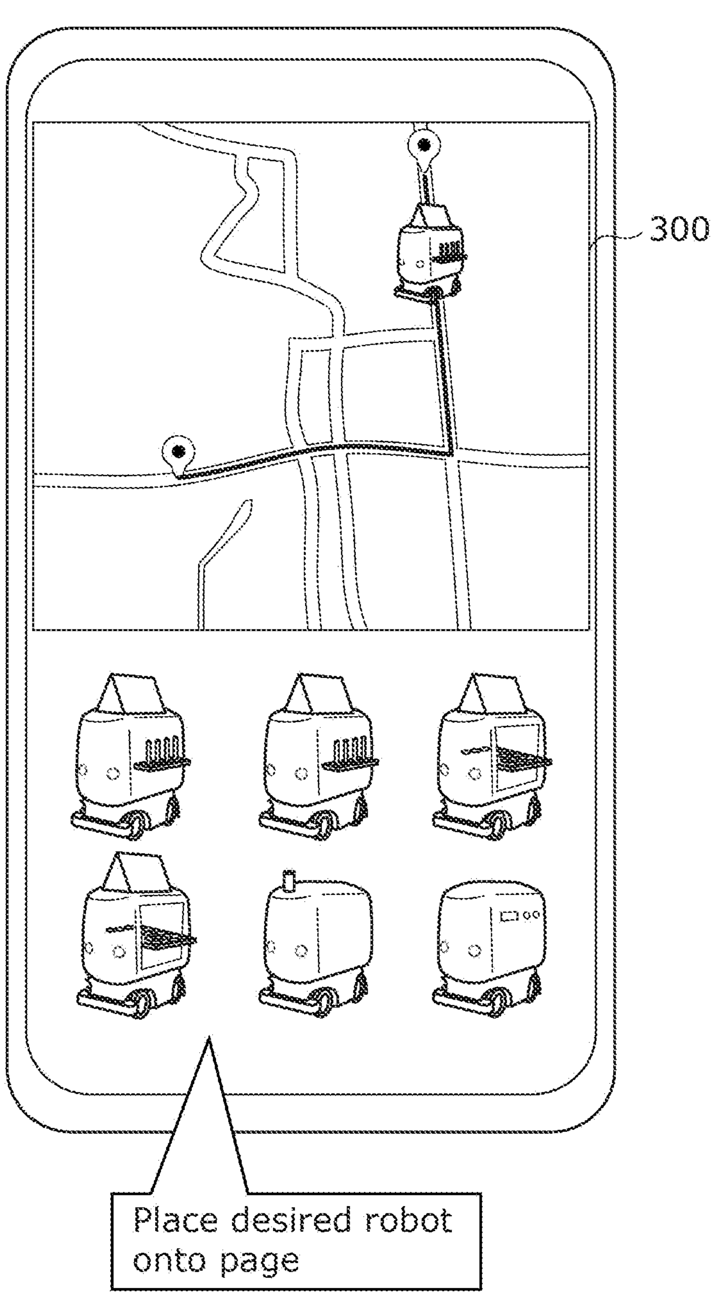
FIG. 13 illustrates another example of the displayed page presented on the terminal device.

Terminal device 300 receives the second information including the service-related information from remote operating system 100. Then, terminal device 300 displays the service-related information on outputter 303. As illustrated in FIG. 12 and FIG. 13, terminal device 300 superimposes the locations of the service robot and the user on the map. Terminal device 300 may also output the providable-service menu list.

Terminal device 300 receives, from user 500, the selection of a service or service robot desired by user 500. For example, terminal device 300 receives the selection of one among the service robots displayed on the map. When receiving the selection, terminal device 300 may also receive selection of a location at which the service robot is desired to arrive (for example, the location of the user) and a departure time (for example, the current time).

Terminal device 300 generates the second information including the service-related information that indicates user selection information and user designation information (such as the location at which the service robot is desired to arrive and the departure time). Then, terminal device 300 transmits the second information to remote operating system 100.

A page displayed on terminal device 300 may be presented for each of characteristics of the area. In this case, the service to be provided may be associated with the characteristic of the area.

Note that the characteristics of the area may include: the kind of the area (such as park, residential area, commercial facility, or company premises); the location of the area; and an event or the like held in the area. The characteristics of the area may include span of time (morning, afternoon, or evening), season, and weather.

The presentation information may vary according to the age group living in the area.

The age group living in the area may be determined from the user information. Alternatively, the age group may be determined by estimating ages of pedestrians caught on, for example, a surveillance camera installed in the area. The age group may be determined based on buildings in the area. For example, the area with many schools may be determined to include a high number of teenage young people. The page displayed on terminal device 300 may be determined by reference to statistical information indicating kinds of the services frequently used in this area based on a service usage history.

<Use Case 1>

At dinner time in residential area A, a plurality of stall robots that are likely to have high demands travel around as the plurality of autonomous mobile robots 200. The plurality of stall robots include a beer server robot, a tofu shop robot, a ramen-noodle shop robot, and a book robot. The provider of contents periodically delivers the goods or materials to be loaded on the aforementioned plurality of stall robots, to a warehouse-cum-station used as both the warehouse and the robot waiting station in residential area A. The plurality of autonomous mobile robots 200, each including box section 210 used for providing a desired content and a module contained in a cabin suitable for the desired content, are prepared in the warehouse-cum-station.

Remote operating system 100 causes the prepared autonomous mobile robots 200 to travel around in residential area A that is the service providing area, according to demand data.

For example, at an evening drink time, the user of the service providing system uses a smartphone application of terminal device 300 to display a portal site of an area stall service on terminal device 300. The portal site includes the icons of the plurality of autonomous mobile robots 200 as many stall robots provided in the corresponding service providing area.

Next, the user operates terminal device 300 to select the icon of autonomous mobile robot 200 that provides the beer service among the plurality of autonomous mobile robots 200 presented on terminal device 300. As a result, the current location of the selected autonomous mobile robot 200 and the number of contents available for sale are presented on terminal device 300.

Next, the user operates terminal device 300 to select the number of beers (counted as the number of mugs, for example) and enter payment information. As a result, the date and time of the arrival of the selected autonomous mobile robot 200 are presented on terminal device 300. In this case, the current location of terminal device 300 of the user is set as the service providing location. For example, if the user is at home, the service providing location may be in front of the house of the user.

Then, when autonomous mobile robot 200 is approximately at less than a predetermined distance from terminal device 300, terminal device 300 receives a notification indicating time required for autonomous mobile robot 200 to arrive at the service providing location from the current time.

The user causes autonomous mobile robot 200 to pour beer into a members-only specific mug already owned by the user. For example, a radio frequency (RF) tag or a quick response (QR) code (registered trademark) identifying the specific mug owned by the user is attached to the specific mug. The user causes autonomous mobile robot 200 to read information on the RF tag or the QR code (registered trademark) of the specific mug to identify the specific mug, and then pour beer into the specific mug identified. At this time, remote operating system 100 uses automatic sensing to monitor whether any fraud is committed by a customer or any machine failure is caused. In the event of a problem or when receiving an inquiry from the user, autonomous mobile robot 200 communicates with remote operating system 100. With this, autonomous mobile robot 200 receives a remote operation from the remote operator or performs control to enable a conversation between the user and the remote operator. The user presses a receipt completion button provided on autonomous mobile robot 200 or a receipt completion button on the application of terminal device 300. This enables autonomous mobile robot 200 to recognize the completion of the service and then start traveling around in the area again.

Note that remote operating system 100 monitors the amount of beer remaining in a beer keg. If the remaining amount of beer is less than a predetermined remaining amount, remote operating system 100 causes autonomous mobile robot 200 to return to the warehouse-cum-station for a refill. Furthermore, remote operating system 100 monitors the remaining charge of the battery included in autonomous mobile robot 200. If the remaining charge of the battery is less than a predetermined remaining amount, remote operating system 100 causes autonomous mobile robot 200 to return to the aforementioned warehouse-cum-station. Then, the battery is recharged, or is replaced with a fully charged battery.

Note that the demand from the user may be assumed from service history information of the user or from the preference information of the user, for example. The evening drink time may be previously set by the system, or may be estimated from the span of time during which the user used the stall service as indicated in the service usage history of the user.

<Use Case 2>

In a park where people gather, a plurality of stall robots that are likely to have high demands travel around as the plurality of autonomous mobile robots 200. The plurality of stall robots include a soft-serve ice cream robot, a juice robot, a donut robot, a plaything robot, a trash-can robot, and a cleaning robot. The provider of contents periodically delivers the goods or materials to be loaded on the aforementioned plurality of stall robots, to a warehouse-cum-station used as both the warehouse and the robot waiting station near or in the park. The plurality of autonomous mobile robots 200, each including box section 210 used for providing a desired content and a module contained in a cabin suitable for the desired content, are prepared in the warehouse-cum-station.

For example, if the user of the service providing system wants at least one of food, beverage, and plaything while playing in the park that the user is visiting, the user uses a smartphone application of terminal device 300 to display a portal site of an area sales service on terminal device 300. The portal site includes the icons of the plurality of autonomous mobile robots 200 as many stall robots provided in the corresponding service providing area.

Next, the user operates terminal device 300 to select the icon of autonomous mobile robot 200 that provides the soft-serve ice cream service among the plurality of autonomous mobile robots 200 presented on terminal device 300. From the page displayed on terminal device 300, the user finds that the soft-serve ice cream robot is stationary near a bench under a tree. The user operates terminal device 300 to indicate that the user is to come to the location of the soft-serve ice cream robot. In response to this, a scheduled period during which the soft-serve ice cream robot stays stationary is displayed, and a reservation page is displayed. Following the reservation page, the user makes a reservation to buy soft-serve ice cream in three minutes, at which time the user is estimated to arrive by foot at the location where the soft-serve ice cream robot is stationary, for example. The user moves to the location where the soft-serve ice cream robot is stationary and buys soft-serve ice cream.

As described above, the user moves to the location where the soft-serve ice cream robot is stationary and buys soft-serve ice cream from the soft-serve ice cream robot. However, note that the user may select between "Have the robot come" and "Come to the robot" on the application. If "Come to the robot" is selected using terminal device 300, the same processing as described above is performed. If "Have the robot come" is selected using terminal device 300, information indicating that "Have the robot come" has been selected is transmitted from terminal device 300 to remote operating system 100. Remote operating system 100 transmits, to the soft-serve ice cream robot, the control information that causes the soft-serve ice cream robot to move to the current location of the user. As a result, the soft-serve ice cream robot moves to the location of the user.

A park administrator causes the plurality of autonomous mobile robots 200 to be placed as a plurality of trash-can robots. Remote operating system 100 determines locations of the plurality of trash-can robots, based on the current locations of trash-cans and people-congestion information obtained from a transport robot and surveillance footage. Then, remote operating system 100 causes the plurality of trash-can robots to move to appropriate locations.

The trash-can robot facilitates trash collection by saying "Give me trash!" to visitors to the park. When a trash collection container of the trash-can robot is full, the trash-can robot transmits information about the full trash collection container to remote operating system 100. Receiving the information about the full trash collection container from the trash-can robot, remote operating system 100 instructs the trash-can robot having the full trash collection container to return to the station. After the trash in the collection container is removed at the station, the trash-can robot travels around in the park again.

Remote operating system 100 predicts the amount of trash to be generated in the park, based on data indicating the amount of trash contained in the trash can, the number of visitors, and the sales figures made by the other stall robots. To operate the trash-can robots, remote operating system 100 calculates an appropriate number of trash-can robots to be placed in the park, an appropriate timing to place the trash-can robots, and appropriate locations of the trash-can robots.

As described, when the collection container is full, the trash-can robot transmits the information about the full collection container to remote operating system 100, which then instructs the trash-can robot to return to the station. However, this is not intended to be limiting. When the collection container is full, the trash-can robot may automatically return to the station without the control of remote operating system 100. When automatically returning to the station, the trash-can robot may transmit information about this return to the station to remote operating system 100.

<Use Case 3>

Box section 210 of the stall robot that provides the stall service in the daytime as described in use case 2 may be replaced so that this stall robot can be used as a security robot at night. The security robot may patrol the service providing area, such as company premises, park, or residential area.

An area administrator monitors whether an anomaly is occurring in the service providing area via the security robot, using an artificial intelligence (AI) sensing function of the security robot and an AI anomaly detection function of remote operating system 100. The security robot performs automatic monitoring in normal times. Only in the event of an anomaly, the security robot issues an alert. If the security robot detects a person in the service providing area, the remote operator may caution this person to be careful or have a conversation with this person via remote operating system 100 and the security robot. This allows the remote operator alone to monitor the service providing area at night via the plurality of security robots. More specifically, monitoring can be performed by a small number of people. Furthermore, unlike a surveillance camera, the robots can travel around in the service providing area to perform monitoring. This enhances the efficiency of monitoring.

Advantageous Effects

Remote operating system 100 as the information output device according to the embodiment obtains, from each of at least two autonomous mobile robots 200 each providing at least one service, first information including information about a location of autonomous mobile robot 200 and information about a service provided by autonomous mobile robot 200. Remote operating system 100 presents, based on the first information, information about at least two services provided by the at least two autonomous mobile robots 200 to terminal device 300 used by a user that receives the service among the at least two services. Remote operating system 100 obtains, from terminal device 300, second information including: a service providing location designated by the user to receive the service; and information about the service selected by the user. Remote operating system 100 determines, based on the second information, one autonomous mobile robot 200 providing the service selected by the user among the at least two autonomous mobile robots 200. Remote operating system 100 outputs, to the one autonomous mobile robot 200 determined, first control information used for moving the one autonomous mobile robot 200 to the service providing location.

With this, the one autonomous mobile robot capable of providing the service selected by the user can be determined from among the at least two autonomous mobile robots each of which provides the at least two services. Then, the one autonomous mobile robot is caused to move to the location where the service is provided. Thus, the user can easily receive the desired service at the location near the current location of the user, without having to search for the location where the service is provided.

The at least two services include at least one of delivery, sale, content distribution, advertising, guidance, security, or checking.

Remote operating system 100 outputs, to terminal device 300, third information about provision of the service selected by the user.

The third information includes information about whether the service is providable.

The third information includes: an arrival time at which the one autonomous mobile robot providing the service is estimated to arrive at the service providing location; and information about a charge of the service.

The service is provided in a predetermined area. The third information changes according to at least one of: a season or span of time in the predetermined area; and an attribute of the user present in the predetermined area.

Remote operating system 100 further manages usage history information of the service provided in the predetermined area. Then remote operating system 100 generates the third information based on the usage history information.

Each of the at least two autonomous mobile robots 200 includes: travel section 220 that controls travel of autonomous mobile robot 200; and box section 210 that is disposed above travel section 220 and used for providing the service.

Box section 210 provides the service selected by the user, using at least one of a cashier function, a conversational function, an image monitoring function, a sale control function, a music outputting function, an image displaying function, or an anomaly sensing function that is achieved by a sensor.

Variation 1

Hereafter, Variation 1 is described.

If autonomous mobile robot 200 that provides a first service is used for providing a second service but autonomous mobile robot 200 lacks the function of providing the second service (this function is referred to as the lacking function), remote operating system 100 may complement this lacking function.

The following describes an example case where autonomous mobile robot 200 (a cleaning robot) that provides a cleaning service is used for providing a security service. Although autonomous mobile robot 200 (a security robot) that provides the security service typically has an anomaly detection function, the cleaning robot does not have this function. Thus, the anomaly detection function of the cleaning robot may be complemented by support from remote operating system 100. The support from remote operating system 100 may be provided through an automatic determination made by a computer. Alternatively, the support may be provided by a remote operator making a determination and then entering the result of the determination into the computer.

In this case, remote operating system 100 determines the lacking function, based on the installed function of the cleaning robot and the function required of a security robot to provide the service. For example, for the cleaning robot to be used as the security robot, remote operating system 100 determines that the lacking function is the anomaly detection function.

Next, the function setup is performed on remote operating system 100 so that remote operating system 100 can complement the lacking function. For example, remote operating system 100 is set up with the anomaly detection function of detecting an anomaly occurring around the cleaning robot based on log information generated through operation performed by the cleaning robot used as the security robot. For example, the cleaning robot is instructed to transmit information on an image of the surroundings captured by the cleaning robot to remote operating system 100 so that remote operating system 100 can "perform anomaly detection".

Note that the anomaly detection function may be implemented on remote operating system 100 and may be automatically performed. To be more specific, remote operating system 100 may have the function of recognizing an anomaly based on the image information indicating the image capturing the surroundings of the cleaning robot. Alternatively, the anomaly detection function may cause the remote operator to watch the image of the surroundings of the cleaning robot on the display of remote operating system 100 and determine whether an anomaly is occurring.

To complement the function manually, or more specifically, by the remote operator, the display of remote operating system 100 may present information about the function that needs to be substitutionally performed by the remote operator (that is, the information indicating the lacking function). This allows the remote operator to know about the function (that is, the lacking function) that is to be complemented by the remote operator. For example, the display may present that anomaly detection is the function to be complemented by the remote operator and that anomaly detection is to watch the image to monitor whether an anomaly is occurring.

To complement a function that autonomous mobile robot 200 lacks, remote operating system 100 may manage information previously defined as in a table illustrated in FIG. 14. In this table, necessary information and necessary processing are defined for each function. Here, the necessary processing may be defined automatically or manually. This allows remote operating system 100 to determine, when autonomous mobile robot 200 is used to provide an alternative service, whether the lacking function of autonomous mobile robot 200 can be complemented by remote operating system 100. For example, if the image cannot be obtained from autonomous mobile robot 200, remote operating system 100 may determine that the anomaly detection function cannot be complemented.

Furthermore, remote operating system 100 can prepare to obtain the information necessary for the complement of the function. For example, to obtain the image from autonomous mobile robot 200, remote operating system 100 can instruct autonomous mobile robot 200 to transmit the image.

In addition to having the function (software) different from that of the security robot cited as an example, the cleaning robot may have a hardware configuration different from that of the security robot. To be more specific, camera positions of cleaning robot differ from those of the security robot cited as an example. For example, although the security robot includes the cameras disposed on the front, rear, right, and left sides of the security robot, the cleaning robot includes the cameras disposed only on the front and rear sides of the cleaning robot. In this case, when providing the security service, the cleaning robot may conduct security by monitoring only the areas in front of and behind the cleaning robot based on the images from the cameras capturing only the areas in front of and behind the cleaning robot. Alternatively, a direction in which greater security is needed may be determined. Then, travel of the robot may be controlled so that imaging can be preferentially performed in the determined direction. More specifically, the cleaning robot that provides the security service may change its attitude to perform monitoring in a different direction. The direction in which greater security is needed may be designated by, for example, the remote operator, or may be automatically determined if a dangerous area is known in advance. In this case, an inquiry may be made to the remote operator or a security business administrator, and then processing to be performed may be determined according to the response to the inquiry.

Furthermore, the cleaning robot that provides the security service may turn off an unnecessary function. For example, the cleaning robot that provides the security service may turn off the cleaning function when conducting security.

To provide the second service using autonomous mobile robot 200 that provides the first service, an instruction from remote operating system 100 may trigger the service switching, or satisfaction of predetermined requirements, such as time and location, may automatically trigger the service switching. In the latter case, if manual support is needed, the remote operator may be notified that the service has been switched.

Furthermore, a service mode of autonomous mobile robot 200 may be switched alternately between cleaning and security. Moreover, autonomous mobile robot 200 may have a mode in which no service is provided. For example, as a result of the service switching, autonomous mobile robot 200 may provide a service combination that includes at least one among three services, which are cleaning, security, and no-service. Then, one service in this combination may be switched. The service to be provided may be switched among: only cleaning; only security; security, together with cleaning; cleaning, together with security; and no service. No service is provided while autonomous mobile robot 200 is returning to the station, for example.

Note that although autonomous mobile robot 200 provides one of the two services, this is not intended to be limiting. Autonomous mobile robot 200 may provide both of the services. Furthermore, autonomous mobile robot 200 may provide one service selected from among at least three services, or may provide at least three services at the same time.

Note that remote operating system 100 may determine whether to add the lacking function to the robot or complement the lacking function by remote operating system 100 itself. For example, remote operating system 100 may determine whether the autonomous mobile robot has the hardware configuration required to provide the second service and also has the software function required to provide the second service. This determination is made by checking the robot information about this autonomous mobile robot against the hardware configuration required to achieve the function of providing the second service.

If determining, as a result, that the autonomous mobile robot does not have these hardware and software functions, remote operating system 100 may add the software function of providing the second service to the autonomous mobile robot and thereby cause the autonomous mobile robot to provide the second service. Here, the hardware configuration required to provide the service refers to a hardware configuration that achieves the function of providing the service. Such a hardware configuration may include various sensors, an actuator, and a display, or may include a processor that has a processing capability required to achieve the function. The hardware configuration that includes the function of providing the service may perform this function with quality exceeding a specific quality required to provide the service.

If determining, as a result, that the autonomous mobile robot does not have the hardware configuration required to provide the second service, remote operating system 100 need not add the software function used for providing the second service. Instead, remote operating system 100 may generate, based on the log information generated through operation made by the autonomous mobile robot, second control information to be used by the autonomous mobile robot to provide the second service, and output the second control information to the autonomous mobile robot. Here, the log information is periodically obtained and includes: a result of detection performed by the sensors included in the autonomous mobile robot; and a control status of operation performed by the autonomous mobile robot. The result of detection performed by the sensors includes: an image captured by the camera included in the autonomous mobile robot; and sound collected by the microphone. Examples of the operation include: obtaining the result of detection performed by these sensors included in the autonomous mobile robot; a status of control over the output device, such as the actuator or the display included in the autonomous mobile robot (or more specifically, transmission of a control command to the output device); and a computation performed by the controller based on a program.

If determining, as a result, that the autonomous mobile robot has the hardware configuration required to provide the second service but does not have the hardware configuration that performs the function with the quality exceeding the specific quality required to provide the service, remote operating system 100 may cause the remote operator of remote operating system 100 to determine whether to add the software function of providing the second service to the autonomous mobile robot.

For example, assume that the processor of the autonomous mobile robot does not have the processing capability required to achieve the function of providing the second service and that the autonomous mobile robot satisfies the other requirements of the hardware configuration to provide the second service. In this case, the autonomous mobile robot may transmit the log information to remote operating system 100, obtain the second control information from remote operating system 100, and then provide the second service by performing the operation based on the second control information. In this case, to complement the function of providing the second service, remote operating system 100 may perform, based on the log information obtained from the autonomous mobile robot, a computation to achieve the software function of providing the second service, generate the second control information based on the result of computation, and output the generated second control information to the autonomous mobile robot. To be more specific, to cause the autonomous mobile robot to provide the second service, remote operating system 100 may partially or fully perform the processing of the software function of providing the second service on behalf of the autonomous mobile robot and output the second control information based on the result of the processing.

As described, remote operating system 100 may partially complement the function of the autonomous mobile robot to provide the second service, by partially performing the processing of the software function of providing the second service. In this case, the autonomous mobile robot has a first function. The first function is at least a part of the software function of implementing the first service provided by the box section of the autonomous mobile robot. A second function is the software function performed together with the first function to provide the second service different from the first service.

Remote operating system 100 may cause the autonomous mobile robot to provide the second service, by fully performing the processing of the software function of providing the second service. In this case, the autonomous mobile robot has the first function. The first function is the software function of implementing the first service provided by the box section of the autonomous mobile robot. The second function is the software function of providing the second service different from the first service.

If the autonomous mobile robot has a part of the software function of providing the second service, the second control information may be information used for adding the rest of the software function of providing the second service to the autonomous mobile robot. If the autonomous mobile robot does not even have a part of the software function of providing the second service, the second control information may be information used for adding all parts of the software function of providing the second service to the autonomous mobile robot.

The autonomous mobile robot may have the first function, and already have the second function that corresponds to a part of the software function of providing the second service. The second function may be turned off. Note that the second function is the software function performed together with the first function to provide the second service. In this case, the second control information may be information used for causing the autonomous mobile robot to turn on the second function.

The autonomous mobile robot may already have the second function that corresponds all parts of the software function of providing the second service. The second function may be turned off. Note that the second function corresponds to all the parts of the software function of providing the second service. In this case, the second control information may be information used for causing the autonomous mobile robot to turn on the second function.

If the software function of providing the second service is added to the autonomous mobile robot, the autonomous mobile robot performs the computation based on the added software function. This allows the second service to be provided without any communication delay. In this case, a processing load on remote operating system 100 can be reduced. Furthermore, if the determination is made by the remote operator, a load on the remote operator to make the determination can be reduced.

In contrast, if remote operating system 100 partially or fully performs the processing of the software function of providing the second service, a processing load on the autonomous mobile robot as well as power consumption can be reduced although a communication delay may occur. This can increase the length of time that the autonomous mobile robot operates autonomously.

Variation 2

Hereafter, Variation 2 is described.

Based on the surrounding situation of a first autonomous mobile robot that provides a first service, remote operating system 100 may provide help using a second autonomous mobile robot that provides a different service. The surrounding situation may be information itself that is obtained as a result of sensing performed by the first autonomous mobile robot. The surrounding situation may be information obtained as a result of determining the surrounding situation based on the sensing information obtained by the first autonomous mobile robot. For example, the information indicating the surrounding situation may be a camera image of the surroundings of the first autonomous mobile robot captured by the first autonomous mobile robot. Alternatively, the information may indicate it is determined from the camera image that many people are gathering around the first autonomous mobile robot. For example, the information indicating the surrounding situation may be a result of predetermined determination made by remote operating system 100 based on the sensing information. Alternatively, the information may be a result of predetermined determination made by a remote operator based on the sensing information. To be more specific, as a result of detecting that people are gathering because the first autonomous mobile robot has started its service, the second autonomous mobile robot may come near the first autonomous mobile robot.

For example, while an entertainment robot (for playing music and movies) is stationary to provide the user with a service (by playing music or a movie), the entertainment robot transmits a camera image capturing the surroundings of the entertainment robot to remote operating system 100. Based on the image of the surroundings of the entertainment robot, remote operating system 100 determines crowdedness of people gathering around the entertainment robot. If determining that the crowdedness exceeds a predetermined value and thus there are many people, remote operating system 100 may dispatch a beverage sales robot. Thus, only after detecting that many people are gathering because the entertainment robot has started its service, remote operating system 100 dispatches the beverage sales robot. This can avoid dispatch made when people are not gathering even after the start of the service.

As described, remote operating system 100 obtains the surrounding situation (the crowdedness of the surroundings) of the first autonomous mobile robot, from the first autonomous mobile robot that provides the first service. Based on the surrounding situation, remote operating system 100 generates third control information used for causing the second autonomous mobile robot that provides a second service different from the first service to come near the first autonomous mobile robot. Then, remote operating system 100 transmits the third control information to the second autonomous mobile robot. To be more specific, remote operating system 100 determines whether the crowdedness of the surroundings exceeds the predetermined value. If the crowdedness of the surroundings exceeds the predetermined value, remote operating system 100 generates the third control information used for causing the second autonomous mobile robot that provides the second service different from the first service to come near the first autonomous mobile robot. Then, remote operating system 100 outputs the third control information to the second autonomous mobile robot. Note that the crowdedness in the surrounding area may be the number of people present in the surrounding area.

Note that remote operating system 100 may manage information used for helping another robot, as illustrated in FIG. 15.

Remote operating system 100 performs control to cause the second autonomous mobile robot to come near the first autonomous mobile robot based on the surrounding situation of the first autonomous mobile robot as described above. However, remote operating system 100 may perform control different from the control causing the second autonomous mobile robot to come near the first autonomous mobile robot. This different control may be automatically determined, or may be determined by making an inquiry to the remote operator or a content provider, for example.

If the control is to be determined by making the inquiry to the remote operator or the content provider, remote operating system 100 may present information to help the remote operator or the content provider make the determination.

For example, remote operating system 100 may present the time remaining before the end of the service provided by the robot (the entertainment robot, for example) that is the source of obtainment of help. This allows remote operating system 100 to determine whether a different robot can arrive before the end of the service. Thus, the different robot can be prevented from arriving when people are not around anymore after the end of the service.

For example, remote operating system 100 may present a next service scheduled to be provided after the end of the current service by the robot (the entertainment robot, for example) that is the source of obtainment. This allows the remote operator to make, if the robot continues to provide the service at the same location, an affirmative determination because the different robot can arrive at the location before the end of the next service. For example, after the end of the service provided by the movie-play robot, a next movie can be played at the same location.

For example, remote operating system 100 may present a location to which the robot is to be dispatched and a distance or time to the location. This allows the remote operator to determine whether to dispatch the robot based on the distance or time to the arrival location.

Remote operating system 100 may make an inquiry to the remote operator or the content provider to determine the processing. In addition to this, the remote operator or the content provider may perform detection (for example, detection of the crowdedness of people or detection of the amount of trash) before the processing. In this case, remote operating system 100 may present, to the remote operator: the type of detection that needs to be performed; and the service of the robot for which the detection is needed. This is because, without this presentation, the remote operator is not sure whether to detect “the crowdedness of people” or “the amount of trash”.

Based on the surrounding situation of the first autonomous mobile robot, remote operating system 100 may cause the second autonomous mobile robot to move away from the first autonomous mobile robot. For example, if the first autonomous mobile robot (the security robot) detects an anomaly, such as a fire, remote operating system 100 may perform control to cause the second autonomous mobile robot to move away from or not to come near the location where the first autonomous mobile robot detected the fire. In the event of a fire, the second autonomous mobile robot, located farther away from the location of the fire than the first autonomous mobile robot, can detect smoke. Even in this case, the second autonomous mobile robot may be unable to detect the cocurrent of fire, but can be prevented from coming near the location of the fire.

Remote operating system 100 may predict in advance that the first autonomous mobile robot that provides the first service can attract people. Then, remote operating system 100 may dispatch in advance the second autonomous mobile robot that provides the second service near the first autonomous mobile robot.

For example, at the timing when the user places an order for the service provided by the first autonomous mobile robot, remote operating system 100 may dispatch the second autonomous mobile robot in response to the order placed with the first autonomous mobile robot.

Based on a past history or content (a popular movie, for example) of the first autonomous mobile robot, remote operating system 100 may predict that the first autonomous mobile robot can attract people by providing the first service.

If the first autonomous mobile robot plays a movie, some users may want to buy beverages before the movie starts. Thus, a predetermined period of time before the first autonomous mobile robot starts playing the movie, remote operating system 100 may dispatch the second autonomous mobile robot near the location where the movie is scheduled to be played by the first autonomous mobile robot. Some users may want to buy beverages after the end of the movie. Thus, remote operating system 100 may cause the second autonomous mobile robot to stay at the location, where the first autonomous mobile robot played the movie, for a predetermined period of time following the end of the movie played by the first autonomous mobile robot.

Remote operating system 100 may determine the service providing location of the second autonomous mobile robot, based on a serving providing way of the first autonomous mobile robot. If the first autonomous mobile robot provides the service of playing a movie and the second autonomous mobile robot is loud, the user may be distracted by the second autonomous mobile robot. In this case, to make the sound (vocalized sound, for example) from the second autonomous mobile robot inaudible, remote operating system 100 may cause the second autonomous mobile robot to stop at a location at a predetermined distance from the first autonomous mobile robot. Note that, instead of causing the second autonomous mobile robot to stop at the location at the predetermined distance from the first autonomous mobile robot, remote operating system 100 may perform control to turn down the sound of the second autonomous mobile robot. Alternatively, remote operating system 100 may mute the sound of the second autonomous mobile robot and enable communication with the user only on the display.

If the second autonomous mobile robot stands in the way between the first autonomous mobile robot and the user, the second autonomous mobile robot blocks the view of the user watching the movie. To avoid this, remote operating system 100 may cause the second autonomous mobile robot to stop at a location outside an area between the first autonomous mobile robot and the user.

Variation 3

Hereafter, Variation 3 is described.

If the user desires a first service that produces sound (music or movies, for example), remote operating system 100 need not allow the user to select, as the service providing location for the first service provided by the first autonomous mobile robot, a location that is located within a predetermined distance from the stopping location of the second autonomous mobile robot providing a second service that also produces sound. To be more specific, if the user selects a service that produces sound, remote operating system 100 may reject a location that is selected as the service providing location but located within a predetermined distance from the stopping location of a different autonomous mobile robot providing a service that also produces sound. In this case, terminal device 300 need not accept an input entered by user 500 to select the location that is located within the predetermined distance from the stopping location of the different autonomous mobile robot. This can prevent the sound of the service robot from disturbing the sound produced by the different service robot.

Furthermore, remote operating system 100 may predict a service that can be desired by the user before or after a different service (movie watching, for example) desired by the user. Then, remote operating system 100 may present a recommended service robot or may automatically dispatch this service robot.

For example, if the user selects the service for watching a movie, remote operating system 100 may present a beverage sales robot and a popcorn sales robot as recommended service robots. The user is highly unlikely to make a purchase during the movie. Thus, remote operating system 100 may present the recommended service robots to terminal device 300 of the user before the movie starts or after the movie ends.

Examples of the service robot recommended before the movie starts include a beverage sales robot (movie preparation) and a popcorn sales robot (movie preparation). Examples of the service robot recommended after the movie ends include an Italian robot (meal providing robot) used for having a meal and a taxi robot used for moving to a next destination.

To dispatch a recommended service robot, remote operating system 100 may ask the user if the user wants any robot, and dispatch the service robot only if requested by the user. This can save a service robot, aside from any service robot not desired by the user, from having to be dispatched.

Other Variations

Although the autonomous mobile robot has the wheels and moves by traveling in the embodiment described above, this is not intended to be limiting. The autonomous mobile robot may have a propeller and moves by flying.

Furthermore, in the above embodiment, each of the structural components may be implemented as dedicated hardware or may be implemented by executing a software program suited to such structural component. Alternatively, each of the structural components may be implemented by a program executor such as a CPU or a processor reading out and executing the software program recorded on a recording medium such as a hard disk or a semiconductor memory. Here, the software that implements the information output method described in the above embodiment is a program as follows.

To be more specific, this program causes a computer to execute the information output method of the information output device. The information output method includes: obtaining, from each of at least two autonomous mobile robots each capable of providing at least one service, first information including information about a location of the autonomous mobile robot and information about a service provided by the autonomous mobile robot; presenting, based on the first information, information about at least two services provided by the at least two autonomous mobile robots to a terminal device used by a user that receives the service; obtaining, from the terminal device, second information including: a service providing location designated by the user to receive the service; and information about the service selected by the user; determining, based on the second information, one autonomous mobile robot capable of providing the service selected by the user among the at least two autonomous mobile robots; and outputting, to the one autonomous mobile robot determined, first control information used for moving the one autonomous mobile robot to the service providing location.

Although the information output method and the information output device according to one or more aspects of the present disclosure have been described above based on the foregoing exemplary embodiments, the present disclosure is not limited to the foregoing embodiments. Forms implemented through various modifications to the embodiment conceived by a person of ordinary skill in the art and forms implemented through a combination of structural components in different embodiments, so long as they do not depart from the essence of the present disclosure, may be included in the scope of the one or more aspects of the present disclosure.

INDUSTRIAL APPLICABILITY

The present disclosure is useful as an information output method that is capable of easily providing a service desired by a user.

The invention claimed is:

1. An information output method used by an information output device, the information output method comprising:

obtaining, from each of at least two autonomous mobile robots each providing at least one service, first information including (i) information about a location of the autonomous mobile robot and (ii) information about a service provided by the autonomous mobile robot;

presenting, based on the first information, information about at least two services provided by the at least two autonomous mobile robots to a terminal device used by a user that receives service among the at least two services;

obtaining, from the terminal device, second information including: a service providing location designated by the user to receive the service; and information about the service selected by the user;

determining, based on the second information, one autonomous mobile robot providing the service selected by the user among the at least two autonomous mobile robots; and outputting, to the one autonomous mobile robot determined, first control information used for moving the one autonomous mobile robot to the service providing location, wherein each of the at least two autonomous mobile robots includes: a travel section that controls travel of the autonomous mobile robot; and a box section that is disposed above the travel section and used for providing the service, the information output method further comprises:

obtaining log information generated as a result of an operation of the box section included in the one autonomous mobile robot;

generating, based on the log information, second control information used for implementing a second function different from a first function of the box section included in the one autonomous mobile robot; and outputting the second control information to the one autonomous mobile robot, the first function is at least a part of a function that implements provision of a first service provided by the box section, the second function is performed together with the first function to implement provision of a second service different from the first service, the first control information includes a remote control signal transmitted to the one autonomous mobile robot and route information indicating a moving route to the service providing location, and the one autonomous mobile robot moves to the service providing location by the travel section controlling a driver based on detection results from a second imager and a sensor each mounted on the one autonomous mobile robot so as not to collide with an obstacle, while following the route information.

2. The information output method according to claim 1, wherein the at least two services include at least one of delivery, sale, content distribution, advertising, guidance, security, or checking.

3. The information output method according to claim 1, further comprising:

outputting, to the terminal device, third information about provision of the service selected by the user.

4. The information output method according to claim 3, wherein the third information includes information about whether the service is providable.

5. The information output method according to claim 3, wherein the third information includes: an arrival time at which the one autonomous mobile robot providing the service is estimated to arrive at the service providing location; and information about a charge of the service.

6. The information output method according to claim 3, wherein the service is provided in a predetermined area, and the third information changes according to at least one of: a season or span of time in the predetermined area; and an attribute of the user present in the predetermined area.

7. The information output method according to claim 6, further comprising:

managing usage history information of the service provided in the predetermined area; and generating the third information based on the usage history information.

8. The information output method according to claim 1, wherein the box section provides the service selected by the user, using at least one of a cashier function, a conversational function, an image monitoring function, a sale control function, a music outputting function, an image displaying function, or an anomaly sensing function that is achieved by a sensor.

9. The information output method according to claim 1, further comprising:

obtaining log information generated as a result of an operation of the box section included in the one autonomous mobile robot;

generating, based on the log information, second control information used for implementing a second function different from a first function of the box section included in the one autonomous mobile robot; and outputting the second control information to the one autonomous mobile robot, wherein the first function implements provision of a first service provided by the box section, and the second function implements provision of a second service different from the first service.

10. The information output method according to claim 1, further comprising:

by comparing a function installed in the one autonomous mobile robot to implement provision of a first service with a function of implementing provision of a second service different from the first service, determining a lacking function that the one autonomous mobile robot lacks to implement provision of the second service;

generating second control information used for adding the lacking function to the one autonomous mobile robot; and outputting the second control information to the one autonomous mobile robot.

11. The information output method according to claim 1, further comprising:

obtaining a surrounding situation of a first autonomous mobile robot from the first autonomous mobile robot that provides a first service;

generating, based on the surrounding situation, third control information used for moving a second autonomous mobile robot that provides a second service different from the first service; and outputting the third control information to the second autonomous mobile robot.

12. The information output method according to claim 1, further comprising:

rejecting, if the service selected by user produces sound, a location that is selected as the service providing location but located within a predetermined distance from a stopping location of a different autonomous mobile robot providing a service that produces sound.

13. A non-transitory computer-readable recording medium having recorded thereon a program for causing a computer to execute the information output method according to claim 1.

14. An information output device comprising:

a processor; and a memory, wherein the processor uses the memory to:

obtain, from each of at least two autonomous mobile robots each providing at least one service, first information including information about a location of the autonomous mobile robot and information about a service provided by the autonomous mobile robot;

present, based on the first information, information about at least two services provided by the at least two autonomous mobile robots to a terminal device used by a user that receives the service among the at least two services;

obtain, from the terminal device, second information including: a service providing location designated by the user to receive the service; and information about the service selected by the user;

determine, based on the second information, one autonomous mobile robot providing the service selected by the user among the at least two autonomous mobile robots; and output, to the one autonomous mobile robot determined, first control information used for moving the one autonomous mobile robot to the service providing location, wherein each of the at least two autonomous mobile robots includes: a travel section that controls travel of the autonomous mobile robot; and a box section that is disposed above the travel section and used for providing the service, wherein the processor further uses the memory to:

obtain log information generated as a result of an operation of the box section included in the one autonomous mobile robot;

generate, based on the log information, second control information used for implementing a second function different from a first function of the box section included in the one autonomous mobile robot; and output the second control information to the one autonomous mobile robot, the first function is at least a part of a function that implements provision of a first service provided by the box section, the second function is performed together with the first function to implement provision of a second service different from the first service, the first control information includes a remote control signal transmitted to the one autonomous mobile robot and route information indicating a moving route to the service providing location, and the one autonomous mobile robot moves to the service providing location by the travel section controlling a driver based on detection results from a second imager and a sensor each mounted on the one autonomous mobile robot so as not to collide with an obstacle, while following the route information.

* * * * *